(12) United States Patent
Cho et al.

(10) Patent No.: US 12,353,871 B2
(45) Date of Patent: Jul. 8, 2025

(54) ELECTRONIC DEVICE, AND METHOD FOR UPDATING EXTERNAL ELECTRONIC DEVICE USING SAME

(71) Applicant: Samsung Electronics Co., Ltd., Suwon-si (KR)

(72) Inventors: Jungho Cho, Suwon-si (KR); Byoungchul Lee, Suwon-si (KR); Gupil Cheong, Suwon-si (KR); Juyeon Jin, Suwon-si (KR); Doosuk Kang, Suwon-si (KR); Bokun Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/500,909

(22) Filed: Nov. 2, 2023

(65) Prior Publication Data

US 2024/0069904 A1 Feb. 29, 2024

Related U.S. Application Data

(63) Continuation of application No. PCT/KR2022/005698, filed on Apr. 21, 2022.

(30) Foreign Application Priority Data

May 10, 2021 (KR) .......................... 10-2021-0060129

(51) Int. Cl.
*G06F 8/65* (2018.01)
*H02J 7/00* (2006.01)
(Continued)

(52) U.S. Cl.
CPC ............ *G06F 8/65* (2013.01); *H02J 7/00032* (2020.01); *H02J 7/0047* (2013.01); *H04B 1/385* (2013.01);
(Continued)

(58) Field of Classification Search
CPC .......... G06F 8/65; G06F 8/71; H02J 7/00032; H02J 7/0047; H02J 7/00; H02J 7/0048;
(Continued)

(56) References Cited

U.S. PATENT DOCUMENTS 8,589,908 B2 11/2013 Subbakrishna et al.
10,524,037 B2 12/2019 Watson et al.
(Continued)

FOREIGN PATENT DOCUMENTS

CN 102707960 A 10/2012
CN 110366063 A 10/2019
(Continued)

OTHER PUBLICATIONS

International Search Report for PCT/KR2022/005698 mailed Jul. 25, 2022, 5 pages.
(Continued)

*Primary Examiner* — Brian J. Gillis
*Assistant Examiner* — Juan C Turriate Gastulo
(74) *Attorney, Agent, or Firm* — Nixon & Vanderhye, P.C.

(57) ABSTRACT

According to various embodiments of the present disclosure, an electronic device may comprise: a communication circuit, a memory, and at least one processor operatively connected to the communication circuit and the memory, wherein on or more of the ate least one processor is configured to: receive an updating file for updating a second external electronic device from a first external electronic device based on establishing a communication connection with the first external electronic device through the communication circuit; identify whether the second external electronic device needs to be updated, based on the electronic device being safely mounted on the second external electronic device; identify whether a designated condition
(Continued)

for transmitting the updating file to the second external electronic device is satisfied, based on state information of the second external electronic device and/or state information of the electronic device based on the second external electronic device needing to be updated; and transmit the updating file received from the first external electronic device to the second external electronic device based on the designated condition for transmitting the updating file to the second external electronic device being satisfied.

15 Claims, 17 Drawing Sheets

(51) Int. Cl.
*H04B 1/3827* (2015.01)
*H04B 3/54* (2006.01)
*H04R 1/10* (2006.01)

(52) U.S. Cl.
CPC ....... *H04B 3/54* (2013.01); *H04B 2001/3872* (2013.01); *H04R 1/1016* (2013.01); *H04R 1/1025* (2013.01)

(58) Field of Classification Search
CPC ....... H02J 7/00034; H04B 1/385; H04B 3/54; H04B 2001/3872; H04B 1/3827; H04R 1/1016; H04R 1/1025; H04R 2460/17
See application file for complete search history.

(56) References Cited

U.S. PATENT DOCUMENTS

| | | | |
|---|---|---|---|
| 10,542,342 B1* | 1/2020 | Betita | G08B 5/38 |
| 10,866,800 B2 | 12/2020 | Sugiyama et al. | |
| 11,477,563 B2 | 10/2022 | Yang et al. | |
| 2015/0178068 A1* | 6/2015 | Kim | G06F 21/572 717/170 |
| 2016/0042337 A1* | 2/2016 | Ota | G06Q 50/12 705/21 |
| 2016/0098264 A1 | 4/2016 | Proschowsky | |
| 2017/0237294 A1* | 8/2017 | Niklaus | H02J 7/0044 307/104 |
| 2018/0091887 A1* | 3/2018 | Minoo | H04R 1/1025 |
| 2019/0075390 A1 | 3/2019 | Koss et al. | |
| 2019/0081499 A1* | 3/2019 | Sun | H02J 7/00034 |
| 2019/0281147 A1 | 9/2019 | Sherburne et al. | |
| 2020/0310780 A1* | 10/2020 | Chen | G06F 9/4411 |
| 2021/0136479 A1* | 5/2021 | Yang | G06F 8/65 |
| 2021/0389940 A1* | 12/2021 | Iwata | B60L 58/12 |
| 2022/0329096 A1* | 10/2022 | Wang | H02J 50/80 |

FOREIGN PATENT DOCUMENTS

| | | | |
|---|---|---|---|
| CN | 111615030 A | * | 9/2020 |
| JP | 4981549 B2 | | 7/2012 |
| JP | 6786937 B2 | | 11/2020 |
| KR | 20070092036 A | | 9/2007 |
| KR | 20150072240 A | | 6/2015 |
| KR | 20160019377 A | | 2/2016 |
| WO | 2019237459 A1 | | 12/2019 |
| WO | 2019237460 A1 | | 12/2019 |

OTHER PUBLICATIONS

Written Opinion of the ISA for PCT/KR2022/005698 mailed Jul. 25, 2022, 5 pages.
Extended Search Report dated Aug. 12, 2024 for EP 22807642.8.

* cited by examiner

FIG. 3
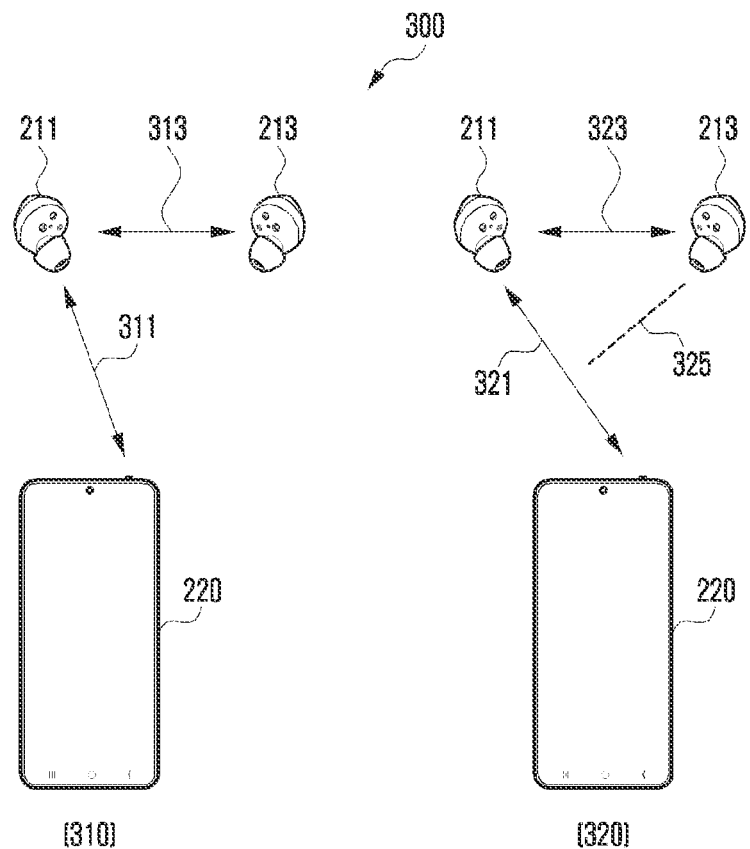
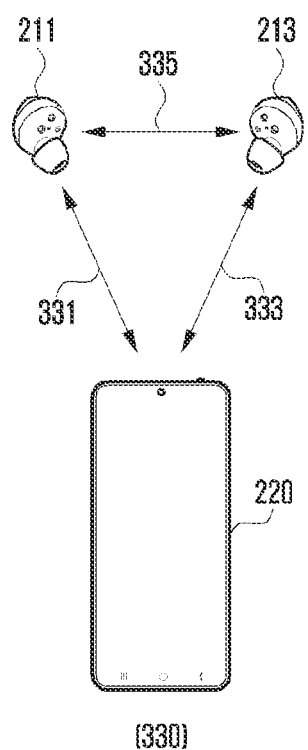

FIG. 4
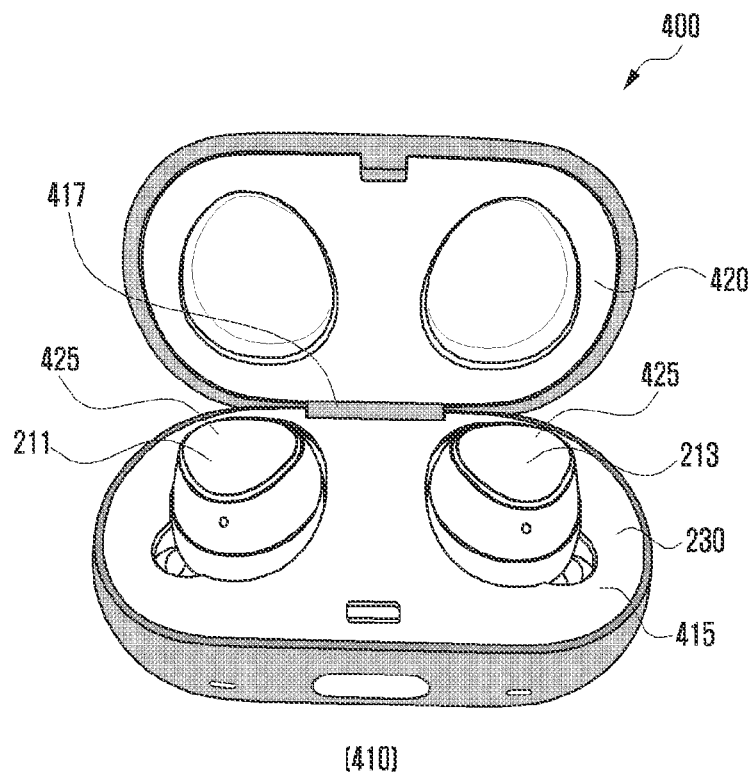
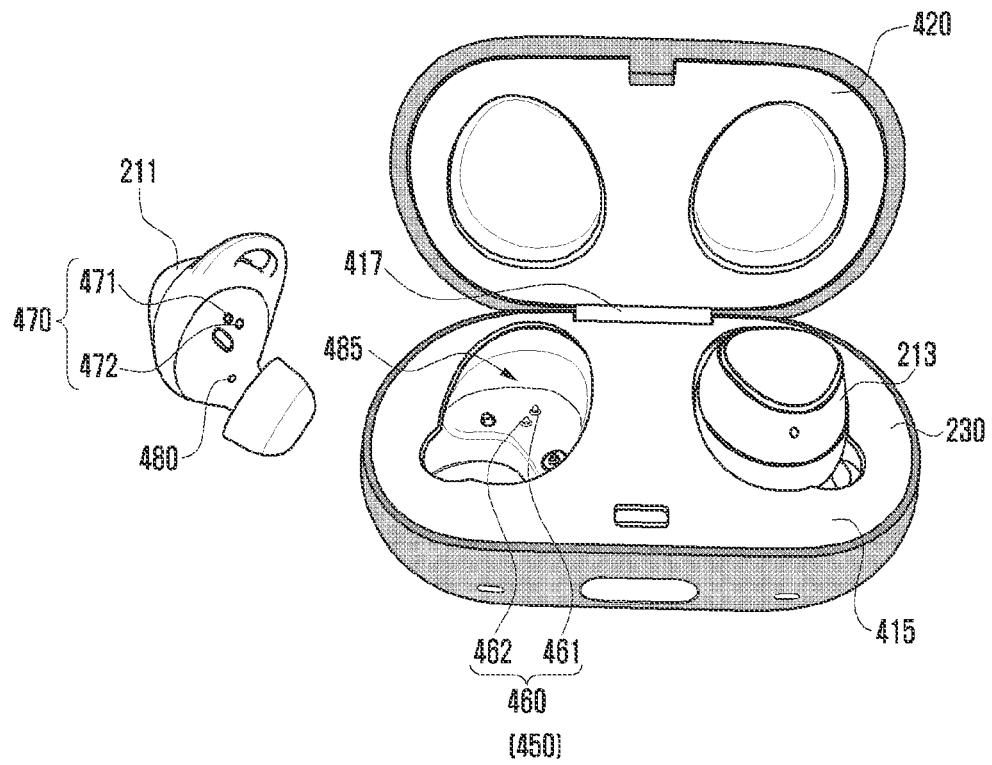

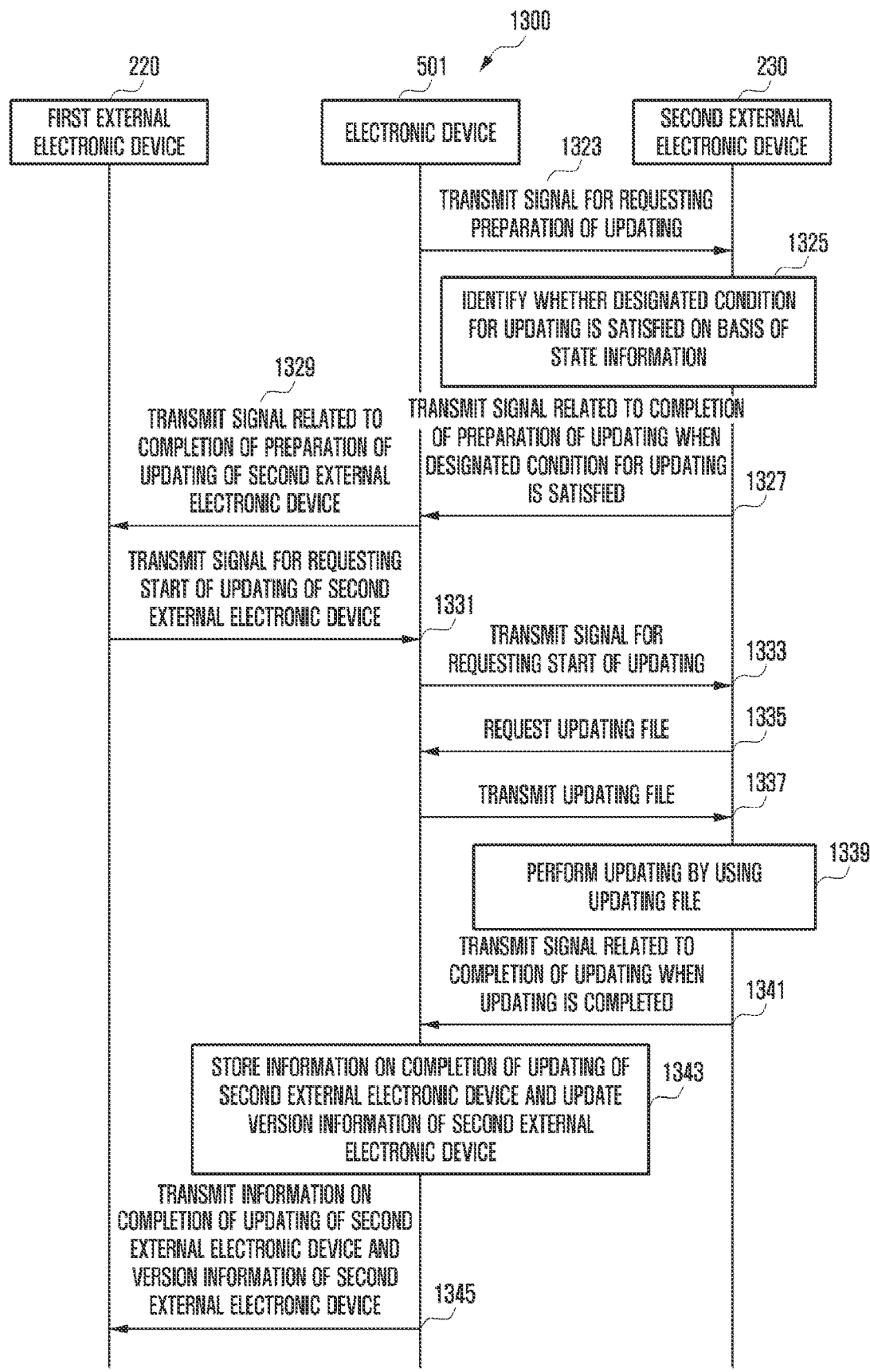

ELECTRONIC DEVICE, AND METHOD FOR UPDATING EXTERNAL ELECTRONIC DEVICE USING SAME

CROSS-REFERENCE TO RELATED APPLICATIONS

This application is a continuation of International Application No. PCT/KR2022/005698 designating the United States, filed on Apr. 21, 2022, in the Korean Intellectual Property Receiving Office and claiming priority to Korean Patent Application No. 10-2021-0060129, filed on May 10, 2021, in the Korean Intellectual Property Office, the disclosures of each of which are incorporated by reference herein in their entireties.

BACKGROUND

Field

The disclosure relates to an electronic device and a method of updating an external electronic device using the same.

Description of Related Art

An electronic device, such as a wireless audio device, may output an audio signal received from an external electronic device. The electronic devices may include two electronic devices (e.g., left/right wireless audio devices), and the two electronic devices may be seated in a case and stored and/or charged. The case may be required to be updated to provide new functions, improve performance, and/or correct errors. To this end, the case may be connected to the external electronic device through a wired interface, and the case may be updated by the external electronic device.

However, the process of connecting the case to the external electronic device to update the case through the wired interface each time the case needs to be updated may inconvenience a user.

SUMMARY

Embodiments of the disclosure may provide an electronic device that may receive an updating file for updating a case from an external electronic device connected to the electronic device through wireless communication and store the updating file. In case that a designated condition for updating the case is satisfied after the electronic device is seated in the case, the electronic device may transmit the updating file received from the external electronic device to the case so that the case may be updated.

According to various example embodiments, electronic device includes: a communication circuit; a memory; and at least one processor operatively connected to the communication circuit and the memory, wherein one or more of the at least one processor is configured to: receive an updating file for updating a second external electronic device from a first external electronic device based on a communication connection with the first external electronic device through the communication circuit; identify whether the second external electronic device is required to be updated based on the electronic device being seated in the second external electronic device; identify whether a designated condition for transmitting the updating file to the second external electronic device is satisfied based on state information of the second external electronic device and/or state information of the electronic device based on the second external electronic device being required to be updated; and transmit the updating file, received from the first external electronic device, to the second external electronic device based on the designated condition for transmitting the updating file to the second external electronic device being satisfied.

According to various example embodiments, a method of updating an external electronic device using an electronic device includes: receiving an updating file for updating a second external electronic device from a first external electronic device based on a communication connection with the first external electronic device; identifying whether the second external electronic device is required to be updated based on the electronic device being seated in the second external electronic device; identifying whether a designated condition for transmitting the updating file to the second external electronic device is satisfied based on state information of the second external electronic device and/or state information of the electronic device based on the second external electronic device being required to be updated; and transmitting the updating file, received from the first external electronic device, to the second external electronic device based on the designated condition for transmitting the updating file to the second external electronic device being satisfied.

According to various example embodiments, an electronic device includes: a communication circuit; a sensor circuit; a memory; and at least one processor operatively connected to the communication circuit, the sensor circuit, and the memory, wherein one or more of the at least one processor is configured to: receive an updating file from one or more external electronic devices through the communication circuit based on seating of the one or more external electronic devices being detected by the sensor circuit; identify whether a designated condition for updating the electronic device is satisfied based on state information of the electronic device; and update the electronic device using the received updating file based on the designated condition for updating the electronic device being satisfied.

The electronic device according to various example embodiments of the present disclosure may transmit the updating file, which is received from the external electronic device, to the case in case that the designated condition for updating the case is satisfied after the electronic device is seated in the case. The case may automatically perform the updating operation using the updating file received from the electronic device. Therefore, it is possible to address the problem of the inconvenience of having to connect the case to the external electronic device through the wired interface to update the case.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 3 is a diagram illustrating an example method of establishing communication connection between the first electronic device, the second electronic device, and the first external electronic device according to various embodiments;

FIG. 4 is a perspective view illustrating example states in which the first electronic device and the second electronic device are seated in the second external electronic device and detached from the second external electronic device according to various embodiments;

FIGS. 13A and 13B are signal flow diagrams illustrating example operations between the electronic device, the first external electronic device, and the second external electronic device according to various embodiments.

DETAILED DESCRIPTION

Figure 1:
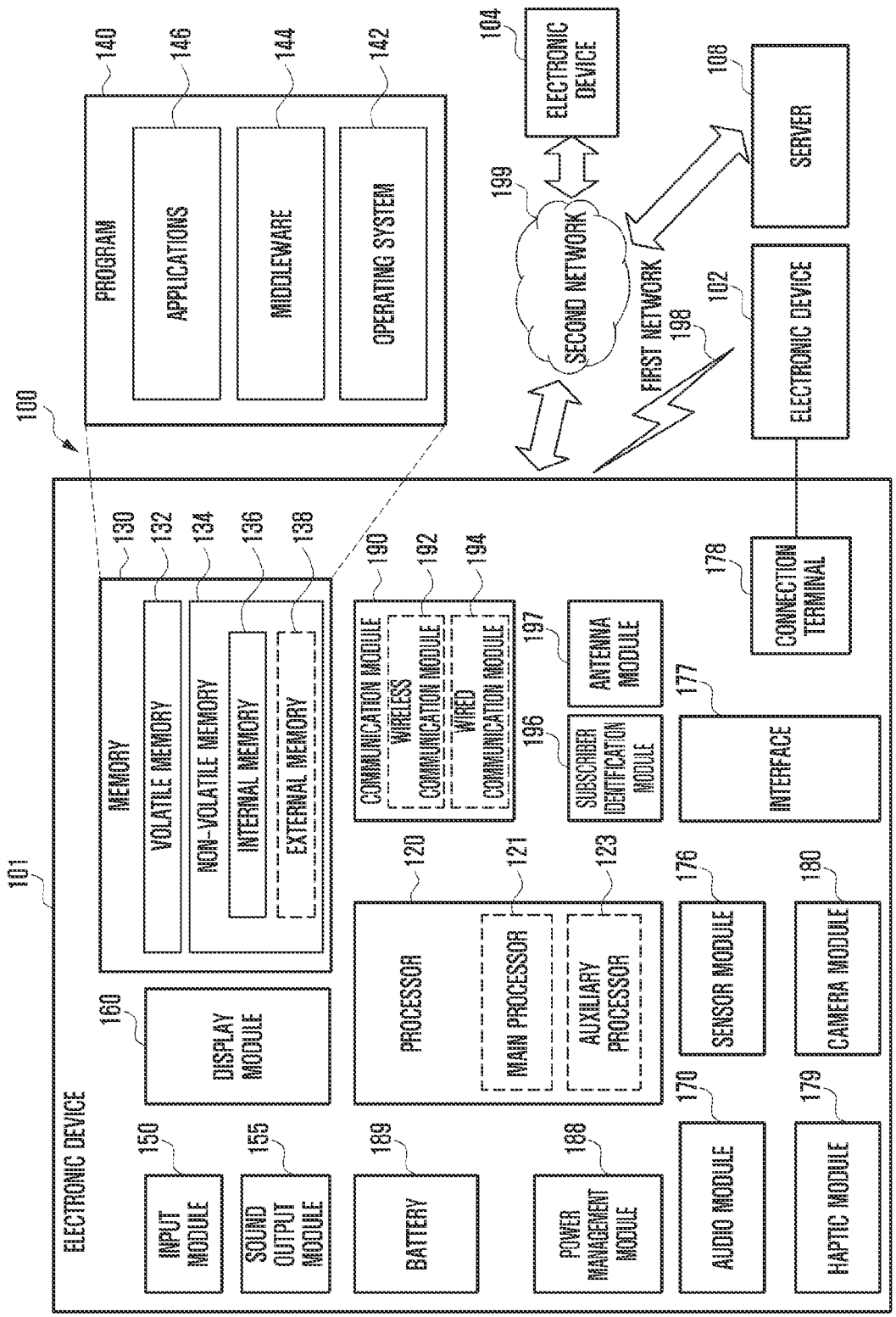
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connection terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and/or an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., through wires) or wirelessly. According to an embodiment, the interface 177 may include, for example, a high-definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., an application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ Wi-Fi direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., an mmwave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
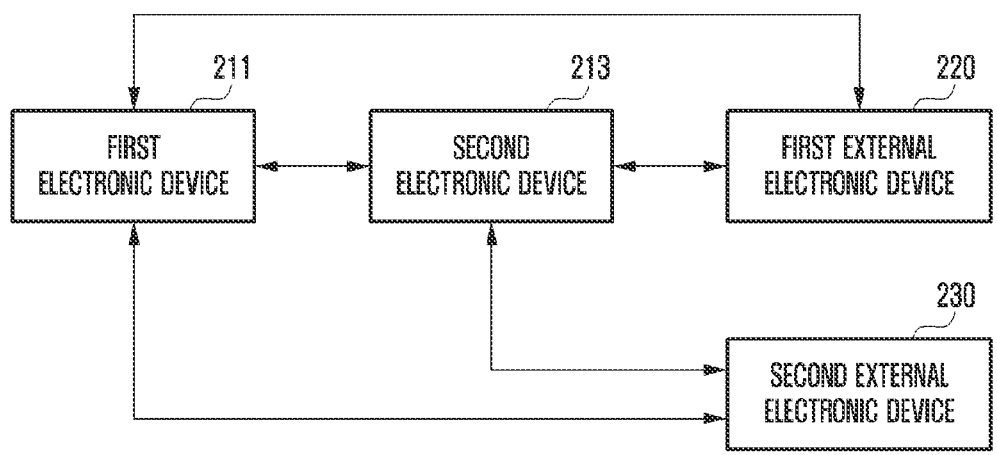
FIG. 2 is a block diagram illustrating an example configuration of a first electronic device, a second electronic device, a first external electronic device, and a second external electronic device according to various embodiments.

FIG. 2 is a block diagram 200 illustrating an example configuration of a first electronic device 211, a second electronic device 213, a first external electronic device 220, and a second external electronic device 230 according to various embodiments.

In various embodiments, the first electronic device 211 and the second electronic device 213 include a single set of electronic devices that may be ear wearable type wireless audio devices designed to be worn on a user's ears. For example, the first electronic device 211 (e.g., a first wireless audio device) may be designed to be worn on the user's left ear. The second electronic device 213 (e.g., a second wireless audio device) may be designed to be worn on the user's right ear.

In various embodiments, the first external electronic device 220 may be the electronic device 101 illustrated in FIG. 1.

In various embodiments, the second external electronic device 230 may be a case into which the first electronic device 211 and the second electronic device 213 may be inserted.

With reference to FIG. 2, the first electronic device 211 and/or the second electronic device 213 may be in communication connection with the first external electronic device 220 through short-range wireless communication (e.g., Bluetooth, Bluetooth Low Energy (BLE), Wi-Fi, Wi-Fi Direct, Wi-Fi aware, or ultra wide band (UWB)).

In various embodiments, the first external electronic device 220 may be in communication connection with the electronic devices (e.g., the first electronic device 211 and/or the second electronic device 213) through the short-range wireless communication, and the first external electronic device 220 may receive information of the second external electronic device 230 (e.g., identification information of the second external electronic device 230 and/or version information of firmware installed in the second external electronic device 230) from the electronic devices (e.g., the first electronic device 211 and/or the second electronic device 213).

In an embodiment, the first external electronic device 220 may identify whether an updating file required to update the firmware installed in the second external electronic device 230 exists in a server on the basis of the information of the second external electronic device 230 received from the electronic devices (e.g., the first electronic device 211 and/or the second electronic device 213). In case that the updating file required to update the firmware installed in the second external electronic device 230 exists in the server, the first external electronic device 220 may download the updating file from the server and transmit the updating file to the electronic devices (e.g., the first electronic device 211 and/or the second electronic device 213). For example, the first external electronic device 220 may transmit the updating file to the first electronic device 211 and the second electronic device 213. In this case, the first electronic device 211 and the second electronic device 213 may receive the same updating file from the first external electronic device 220 and store the updating file in a memory (e.g., a memory 515 in FIG. 5).

As another example, the first external electronic device 220 may transmit the updating file to one electronic device (e.g., the first electronic device 211 or the second electronic device 213). In this case, one electronic device (e.g., the first electronic device 211 or the second electronic device 213) may store the updating file, which is received from the first external electronic device 220, in the memory (e.g., the memory 515 in FIG. 5).

As still another example, one electronic device (e.g., the first electronic device 211 or the second electronic device 213) may divide the updating file received from the first external electronic device 220 into a first updating file and a second updating file. One electronic device (e.g., the first electronic device 211 or the second electronic device 213) may store the first updating file in the memory. One electronic device (e.g., the first electronic device 211 or the second electronic device 213) may transmit the second updating file to the other electronic device (e.g., the second electronic device 213 or the first electronic device 211). The other electronic device (e.g., the second electronic device 213 or the first electronic device 211) may store the second updating file, which is received from one electronic device (e.g., the first electronic device 211 or the second electronic device 213), in the memory.

As still another example, the first external electronic device 220 may divide the updating file into the first updating file and the second updating file. The first external electronic device 220 may transmit the first updating file to the first electronic device 211 and transmit the second updating file to the second electronic device 213. In this case, the first electronic device 211 may store the first updating file, which is received from the first external electronic device 220, in the memory (e.g., the memory 515 in FIG. 5). The second electronic device 213 may store the second updating file, which is received from the first external electronic device 220, in the memory (e.g., the memory 515 in FIG. 5).

In an embodiment, when the electronic devices (e.g., the first electronic device 211 and/or the second electronic device 213) are seated in the second external electronic device 230, whether the second external electronic device 230 is required to be updated may be identified on the basis of the information related to the second external electronic device 230. For example, the electronic devices (e.g., the first electronic device 211 and/or the second electronic device 213) identify that the version information of the updating file for updating the second external electronic device 230 received from the first external electronic device 220 is a higher level version than the version information of the firmware installed in the second external electronic device 230, the electronic devices (e.g., the first electronic device 211 and/or the second electronic device 213) may identify that the second external electronic device 230 is required to be updated. On the basis of the identification indicating that the second external electronic device 230 is required to be updated, the electronic devices (e.g., the first electronic device 211 and/or the second electronic device 213) may transmit the updating file for updating the firmware installed in the second external electronic device 230 to the second external electronic device 230.

In an embodiment, in case that a designated condition for updating the firmware installed in the second external electronic device 230 is satisfied, the second external electronic device 230 may update the firmware using the updating file received from the electronic devices (e.g., the first electronic device 211 and/or the second electronic device 213). For example, on the basis that the communication connection with at least one electronic device (e.g., the first electronic device 211 and/or the second electronic device 213) is released (e.g., the first electronic device 211 and the second electronic device 213 are detached from the second external electronic device 230), the designated condition for updating the second external electronic device 230 may include, for example, and without limitation, whether the second external electronic device 230 is in a stand-alone (SA) mode, whether a battery residual amount of the second external electronic device 230 exceeds a designated value, whether a temperature of the second external electronic device 230 exceeds a designated range, whether the second external electronic device 230 is in a state of being stably charged, and/or whether a user input for updating the firmware installed in the second external electronic device 230 through an input device (not illustrated) separately provided in the second external electronic device 230 is detected.

Various embodiments related to the operations of the first electronic device 211, the second electronic device 213, the first external electronic device 220, and/or the second external electronic device 230 for updating the second external electronic device 230 according to various example embodiments will be described in greater detail below with reference to FIGS. 3 to 14B.

FIG. 3 is a diagram 300 illustrating an example method of establishing communication connection between the first electronic device 211, the second electronic device 213, and the first external electronic device 220 according to various embodiments. With reference to FIG. 3, the first electronic device 211 and/or the second electronic device 213 may be in communication connection with the first external electronic device 220 (e.g., the electronic device 101 in FIG. 1) through short-range wireless communication. The first electronic device 211 and the second electronic device 213 may, for example, be connected to the first external electronic device 220 as one electronic device through the same Bluetooth mac address.

In various embodiments, the first electronic device 211 and/or the second electronic device 213 may be connected to the first external electronic device 220 through short-range wireless communication through a relay method, a sniffing method, or a true wireless stereo plus (TWS+) method.

For example, as illustrated in reference numeral <310>, the first electronic device 211 and/or the second electronic device 213 may be in communication connection with the first external electronic device 220 through the relay method. In the case of the communication connection by the relay method, one electronic device (e.g., the first electronic device 211 or the second electronic device 213) of the first electronic device 211 and the second electronic device 213 may be representatively in communication connection with the first external electronic device 220 using a first communication link 311. The other electronic device (e.g., the second electronic device 213 or the first electronic device 211) may be in communication connection with the first electronic device 211 using a second communication link 313, the first electronic device 211 being in communication connection with the first external electronic device 220 using the first communication link 311.

As another example, as illustrated in reference numeral <320>, the first electronic device 211 and/or the second electronic device 213 may be in communication connection with the first external electronic device 220 by the sniffing method. In the case of the communication connection by the sniffing method, one electronic device (e.g., the first electronic device 211 or the second electronic device 213) of the first electronic device 211 and the second electronic device 213 may be representatively in communication connection with the first external electronic device 220 using a first communication link 321. The other electronic device (e.g., the second electronic device 213 or the first electronic device 211) may be in communication connection with one electronic device (e.g., the first electronic device 211 or the second electronic device 213) using a second communication link 323, one electronic device (e.g., the first electronic device 211 or the second electronic device 213) being in communication connection with the first external electronic device 220 using the first communication link 321. In this case, the other electronic device (e.g., the second electronic device 213 or the first electronic device 211) may overhear a signal transmitted to one electronic device (e.g., the first electronic device 211 or the second electronic device 213) being in communication connection with the first external electronic device 220 using the first communication link 321 (325). The first external electronic device 220 may identify that the electronic device (e.g., the second electronic device 213 or the first electronic device 211), which overhears a signal to prevent and/or reduce a malicious user, is a device connected by being paired with the electronic device (e.g., the first electronic device 211 or the second electronic device 213) being in communication connection using the second communication link 323.

As still another example, as illustrated in reference numeral <330>, the first electronic device 211 and/or the second electronic device 213 may be in communication connection with the first external electronic device 220 by the TWS+ method. In the case of the communication connection by the TWS+ method, one electronic device (e.g., the first electronic device 211 or the second electronic device 213) of the first electronic device 211 and the second electronic device 213 may be in communication connection with the first external electronic device 220 using a first communication link 331. The other electronic device (e.g., the second electronic device 213 or the first electronic device 211) may be in communication connection with the first external electronic device 220 using a second communication link 333. The first electronic device 211 may be in communication connection with the second electronic device 213 using a third communication link 335.

The present disclosure is not limited thereto. Although not illustrated, the first electronic device 211 and the second electronic device 213 may have different mac addresses (e.g., Bluetooth mac addresses). In this case, the first electronic device 211 and the second electronic device 213 may be independently in communication connection with the first external electronic device 220.

FIG. 4 is includes perspective views 400 illustrating example states in which the first electronic device 211 and the second electronic device 213 are seated in the second external electronic device 230 and detached from the second external electronic device 230 according to various embodiments.

With reference to FIG. 4, the first electronic device 211 and the second electronic device 213 according to various embodiments may be ear wearable type wireless audio devices designed to be worn on the user's ears. For example, the first electronic device 211 (e.g., the first wireless audio device) may be designed to be worn on the user's left ear. The second electronic device 213 (e.g., the second wireless audio device) may be designed to be worn on the user's right ear.

The second external electronic device 230 according to various embodiments may be the case into which the first electronic device 211 and/or the second electronic device 213 may be inserted.

Reference numeral <410> according to various embodiments is a view illustrating a state in which the first electronic device 211 and/or the second electronic device 213 are seated (e.g., accommodated or mounted) in grooves 485 formed in a first housing structure 415. Reference numeral <450> according to various embodiments is a view illustrating a state in which the first electronic device 211 is detached (e.g., separated) from the second external electronic device 230.

In an embodiment, the second external electronic device 230 may include a housing provided in the form of a case capable of storing the first electronic device 211 and/or the second electronic device 213.

In an embodiment, the housing may include the first housing structure 415 having the grooves 485 in which the first electronic device 211 and/or the second electronic device 213 may be seated, a second housing structure 420 configured to serve as a cover for the first housing structure 415, and a hinge structure 417 configured to couple the first housing structure 415 and the second housing structure 420 so that the first housing structure 415 and the second housing structure 420 are rotatable. For example, in an open state in which the second housing structure 420 has a predetermined angle with respect to the first housing structure 415, one side of the first housing structure 415 may be connected to one side of the second housing structure 420 by means of the hinge structure 417. One housing structure of the first housing structure 415 and the second housing structure 420 may include a magnet, and the other structure may include a Hall sensor using the magnet. The second external electronic device 230 may use the Hall sensor and detect a fastened state (e.g., a closed state) or a released state (e.g., an open state) of the first housing structure 415 and the second housing structure 420. For example, the second external electronic device 230 may further include a physical button (not illustrated) for unfastening the first housing structure 415 and the second housing structure 420. The first housing structure 415 and the second housing structure 420 may be unfastened by a manipulation of the physical button (not illustrated). However, the present disclosure is not limited thereto.

In various embodiments, the second external electronic device 230 may include an indicator (e.g., one or more LED devices capable of producing outputs) that indicates a state in which the second external electronic device 230 operates (e.g., a state in which the first electronic device 211 and/or the second electronic device 213 are supplied with power (or charged) and a state in which the first electronic device 211 and/or the second electronic device 213 exchange data (e.g., information of the first electronic device 211 or information of the second electronic device 213).

In an embodiment, the first electronic device 211 and/or the second electronic device 213 may be seated in the grooves 485 formed in the first housing structure 415. In an embodiment, the grooves 485 of the first housing structure 415 may be formed so that earplugs of the first electronic device 211 and/or the second electronic device 213 are inserted into the grooves 485.

In an embodiment, when the first electronic device 211 and/or the second electronic device 213 are seated in the grooves 485, the surfaces of the first electronic device 211 and/or the second electronic device 213 opposite to the earplugs may be exposed when viewed from above the first housing structure 415.

In an embodiment, the first electronic device 211 and/or the second electronic device 213 may each include a microphone 480 capable of receiving an input in the form of a sound. Touch sensors 425 may be provided on the surfaces of the first electronic device 211 and/or the second electronic device 213 opposite to the earplugs. The user may control the functions of the first electronic device 211 and/or the second electronic device 213 using the touch sensors 425.

In various embodiments, one or more terminals 460 for supplying power to the first electronic device 211 and/or the second electronic device 213 may be provided in each of the grooves 485 of the first housing structure 415. For example, the one or more terminals 460 may include a first terminal 461 for supplying a high-potential voltage, and a second terminal 462 for supplying a low-potential voltage. In an embodiment, the first electronic device 211 may have terminals 470 that physically come into contact with the one or more terminals 461 and 462 while the first electronic device 211 is seated in the groove 485 of the first housing structure 415. For example, the terminals 470 may include a third terminal 471 that physically comes into contact with the first terminal 461 while the first electronic device 211 is seated in the groove 485, and a fourth terminal 472 that physically comes into contact with the second terminal 462 while the first electronic device 211 is seated in the groove 485.

In an embodiment, because the grooves 485 of the first housing structure 415 are formed such that the earplugs of the first electronic device 211 and/or the second electronic device 213 are inserted into the grooves 485, the terminals 470 of the first electronic device 211 may be provided on the surface on which the earplug is provided (e.g., a surface opposite to the touch sensor 425). Therefore, the terminals 470 of the first electronic device 211 may physically come into contact with the terminals 460 of the second external electronic device 230 while the first electronic device 211 is seated in the groove 485.

In various embodiments, the first electronic device 211 and the second external electronic device 230 may define a communication channel using an electrical path created by electrical connection between the first terminal 461 and the third terminal 471 and electrical connection between the second terminal 462 and the fourth terminal 472. For example, the communication channel between the first electronic device 211 and the second external electronic device 230 may be a communication channel implemented by power line communication (PLC).

In various embodiments, although not illustrated, the second electronic device 213 may also be seated in the second external electronic device 230 in the same or similar way as the first electronic device 211. On the basis that the terminals of the second electronic device 213 and the terminals of the second external electronic device 230 physically come into contact with one another, the communication channel may be implemented between the second electronic device 213 and the second external electronic device 230 by the power line communication (PLC).

In various embodiments, in case that the electronic devices (e.g., the first electronic device 211 and/or the second electronic device 213) are seated in the second external electronic device 230, power management integrated circuits (PMICs) (e.g., charging circuits 540 in FIG. 5) of the electronic devices (e.g., the first electronic device 211 and/or the second electronic device 213) may recognize electrical connection with the second external electronic device 230. The PMICs of the electronic devices (e.g., the first electronic device 211 and/or the second electronic device 213) may transfer information on the recognized electrical connection to processors (e.g., processors 550 in FIG. 5) of the electronic devices (e.g., the first electronic device 211 and/or the second electronic device 213). On the basis of the information on the electrical connection with the second external electronic device 230, the processors of the electronic devices (e.g., the first electronic device 211 and/or the second electronic device 213) may identify that the electronic devices (e.g., the first electronic device 211 and/or the second electronic device 213) are seated in the second external electronic device 230.

In various embodiments, although not illustrated, the second external electronic device 230 may include communication circuits for establishing communication connection with the other electronic devices (e.g., the first electronic device 211, the second electronic device 213, and/or the first external electronic device 220).

In various embodiments, although not illustrated, the second external electronic device 230 may further include a button (not illustrated) for controlling the first electronic device 211, the second electronic device 213, and/or the first external electronic device 220 (e.g., controlling an operation of outputting audio signals of the first electronic device 211 and/or the second electronic device 213 and/or controlling the communication connection with the first external electronic device 220) that are in communication connection with the second external electronic device 230 through the communication circuits. The second external electronic device 230 may control the other electronic devices (e.g., the first electronic device 211, the second electronic device 213, and/or the first external electronic device 220), which are in communication connection with the second external electronic device 230, in response to an input to the button (not illustrated). In an embodiment, the button (not illustrated) may be implemented as a pressure sensor or a touch sensor and detect a user input.

Figure 5:
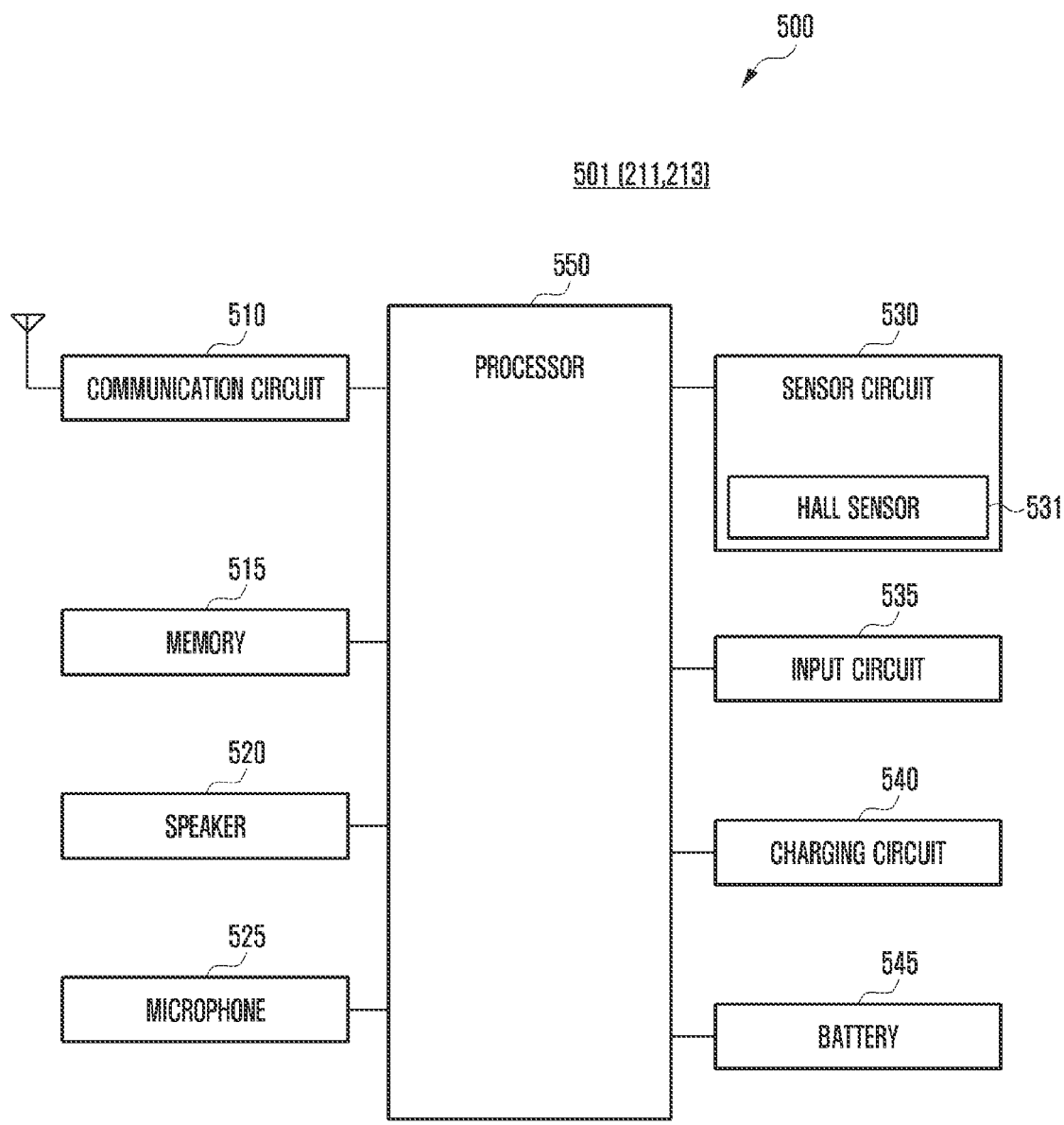
FIG. 5 is a block diagram illustrating an example configuration of the electronic device according to various embodiments.

FIG. 5 is a block diagram 500 illustrating an example configuration of an electronic device 501 according to various embodiments.

The electronic device 501 according to various embodiments may include at least one of the first electronic device 211 and the second electronic device 213 illustrated in FIG. 2.

With reference to FIG. 5, the electronic device 501 may include a communication circuit 510, the memory 515, a speaker 520, a microphone 525, a sensor circuit 530, an input circuit 535, the charging circuit 540, a battery 545, and/or the processor (e.g., including processing circuitry) 550.

According to various embodiments, the communication circuit 510 may establish a communication channel between the electronic device 501, e.g., the first electronic device 211 and/or the second electronic device 213 and the first external electronic device (e.g., the electronic device 101 in FIG. 1 and the first external electronic device 220 in FIG. 2) (e.g., smartphones) and/or the second external electronic device (e.g., the second external electronic device 230 in FIG. 2) (e.g., the case) and support communication performance through the established communication channel.

In an embodiment, the communication circuit 510 may include a wireless communication circuit (e.g., a short-range wireless communication circuit or a global navigation satellite system (GNSS) communication circuit), and/or a wired communication circuit (e.g., a local area network (LAN) communication circuit or a power line communication (PLC) circuit).

According to various embodiments, the memory 515 may store various data used by at least one element (e.g., the sensor circuit 530 and/or the processor 550) of the electronic device 501. For example, the data may include software (e.g., a program) and input or output data associated with instructions related thereto. In an embodiment, the memory 515 may store instructions related to various operations executed by the processor 550.

In an embodiment, the memory 515 may store information for wireless communication connection between the first external electronic device 220 and/or the second external electronic device 230 and the electronic device 501 (e.g., the first electronic device 211 and/or the second electronic device 213). For example, the memory 515 may store address information of the first electronic device 211, address information of the second electronic device 213, address information of the first external electronic device 220, and/or address information of the second external electronic device 230.

In an embodiment, the memory 515 may store information related to the second external electronic device 230 received from the second external electronic device 230 at a designated time point (e.g., identification information, state information, and/or information related to firmware) under the control of the processor 550. For example, the designated time point may include a time point at which the electronic device 501 is seated in the second external electronic device 230. For example, the time point at which the electronic device 501 is seated in the second external electronic device 230 may include a time point at which the terminals (e.g., the terminals 470 in FIG. 4) of the electronic device 501 (e.g., the first electronic device 211 and/or the second electronic device 213) are physically in contact with the terminals (e.g., the terminals 460 in FIG. 4) of the second external electronic device 230, a time point at which the cover (e.g., the second housing structure 420 in FIG. 4) is detected as being in the closed state in the state in which the terminals 470 of the electronic device 501 (e.g., the first electronic device 211 and/or the second electronic device 213) are physically in contact with the terminals 460 of the second external electronic device 230, a time point at which a designated time elapses after the cover 420 is detected as being in the closed state in the state in which the terminals 470 of the electronic device 501 (e.g., the first electronic device 211 and/or the second electronic device 213) are physically in contact with the terminals 460 of the second external electronic device 230, or a time point at which the cover 420 is detected as being in the open state from the closed state in the state in which the terminals 470 of the electronic device 501 (e.g., the first electronic device 211 and/or the second electronic device 213) are physically in contact with the terminals 460 of the second external electronic device 230. The present disclosure is not limited thereto. The designated time point may include a time point at which a designated time elapses after the processor 550 of the electronic device 501 is booted up as the processor 550, which is in a sleep mode state of the electronic device 501, changes in state of charge with the second external electronic device 230 (e.g., a state switches from a charging-off state to a charging-on state) in the state in which the electronic device 501 is seated in the second external electronic device 230.

According to various embodiments, the speaker 520 may output an audio signal corresponding to audio data received from the first external electronic device 220 that is in communication connection.

According to various embodiments, the microphone 525 may include a plurality of microphones. For example, the plurality of microphones may include a first microphone (e.g., an in-ear microphone) (not illustrated), a second microphone (e.g., an outer microphone) (not illustrated), and/or a third microphone (e.g., an outer microphone) (not illustrated). In an embodiment, one of the plurality of microphones, e.g., the first microphone (e.g., the in-ear microphone) may be a microphone mounted in each of the first electronic device 211 and the second electronic device 213 and detect a sound in a human body or a resonance sound in the ear. In an embodiment, at least one of the plurality of microphones, e.g., the second microphone and/or the third microphone (e.g., the outer microphone) may receive voice signals around the electronic device 501 (e.g., the first electronic device 211 and the second electronic device 213).

According to various embodiments, the sensor circuit 530 may include a Hall sensor 531. In an embodiment, the Hall sensor 531 may detect a distance from a magnet included in the second housing structure (e.g., the second housing structure 420 in FIG. 4) of the second external electronic device 230 after the electronic device is seated in the second external electronic device 230. The Hall sensor 531 may acquire a sensor signal related to the closed or open state of the cover of the second external electronic device 230 on the basis of the distance from the magnet included in the second housing structure 420 of the second external electronic device 230. The Hall sensor 531 may transmit the sensor signal, which is related to the closed or open state of the cover of the second external electronic device 230, to the processor 550. The processor 550 may identify whether the cover of the second external electronic device 230 is in the closed state and/or the open state on the basis of the sensor signal received from the Hall sensor 531.

In various embodiments, although not illustrated, the sensor circuit 530 may include a proximity sensor, a grip sensor, an acceleration sensor, and/or a gyro sensor.

In an embodiment, the sensor circuit 530 may use the proximity sensor (not illustrated) and/or the grip sensor (not illustrated) and acquire a sensor signal indicating whether the electronic device 501 is worn on a part of the user's body or the electronic device 501 is detached from the user's body. For example, the proximity sensor (not illustrated) may emit an electromagnetic field or electromagnetic waves (e.g., infrared rays) and acquire a sensor signal related to a returning signal. The grip sensor (not illustrated) may acquire a sensor signal related to a change in capacitance or permittivity. The sensor circuit 530 may transmit the sensor signal, which is acquired using the proximity sensor (not illustrated) and/or the grip sensor (not illustrated), to the processor 550. The processor 550 may identify whether the electronic device 501 is worn on a part of the user's body and/or detached from the user's body on the basis of the sensor signal acquired using the proximity sensor (not illustrated) and/or the grip sensor (not illustrated).

In an embodiment, the acceleration sensor (not illustrated) and the gyro sensor (not illustrated) may include a six-axis sensor. The six-axis sensor may detect the amount of change in motion of the electronic device 501. The six-axis sensor may include an inertia sensor. For example, the acceleration sensor may be a three-axis sensor and measure forces applied in x-axis, y-axis, and z-axis directions. The gyro sensor may be a three-axis sensor and measure an angular velocity by detecting a pitch, a roll, and a yaw.

According to various embodiments, the input circuit 535 may include a touch pad (e.g., the touch sensor 425 in FIG. 4). A user input, such as a user touch and/or a button input, may be detected through the input circuit 535 of the electronic device 501, e.g., the input circuit 535 of each of the first electronic device 211 and the second electronic device 213. On the basis of the user input detected through the input circuit 535, the processor 550 may transmit control signals related to functions of the first external electronic device 220 (e.g., connecting and disconnecting phone calls) and/or control signals related to audio playback (e.g., temporarily pausing, fast forwarding, rewinding) to the first external electronic device 220.

According to various embodiments, the charging circuit 540 may manage power to be supplied to the electronic device 501. In an embodiment, the charging circuit 540 may be implemented as at least a part of a power management integrated circuit (PMIC).

In an embodiment, the PMIC may recognize electrical connection with the second external electronic device 230 when the electronic device 501 is seated in the second external electronic device 230. The PMIC may transfer information on the recognized electrical connection to the processor 550.

According to various embodiments, the battery 545 may supply power to at least one element of the electronic device 501. In an embodiment, the battery 545 may include a primary battery, which is not rechargeable, a secondary battery, which is rechargeable, or a fuel cell.

According to various embodiments, the processor 550 may include various processing circuitry (as used herein, including the claims, the term "processor" may include various processing circuitry, including at least one processor, wherein one or more processors of the at least one processor may be configured to perform the various functions described herein) and control at least one of the other elements (e.g., hardware or software elements) of the first electronic device 211 and/or the second electronic device 213 connected to the processor 550 by executing software (e.g., a program), and the processor 550 may perform various data processing or computation.

In an embodiment, on the basis of the communication connection with the first external electronic device 220 through the short-range wireless communication, the processor 550 may receive an updating file for updating the second external electronic device 230 from the first external electronic device 220 and store the updating file in the memory 515. For example, the updating file may be received by one of the first electronic device 211 and the second electronic device 213. As another example, the updating file may be received by the first electronic device 211 and the second electronic device 213. As still another example, among the updating files, a first updating file may be received by the first electronic device 211, and a second updating file may be received by the second electronic device 213.

The present disclosure is not limited thereto. In case that the first electronic device 211 and/or the second electronic device 213 may be in communication connection with the server through the communication circuit 510, the processor 550 may download an updating file, which is required to update the firmware installed in the second external electronic device 230, from the server and store the updating file in the memory 515.

In an embodiment, the processor 550 may detect that the electronic device 501 is seated in the second external electronic device 230. For example, the processor 550 may identify that the electronic device 501 is seated in the second external electronic device 230 in a case in which the terminals 470 of the electronic device 501 (e.g., the first electronic device 211 and/or the second electronic device 213) are physically in contact with the terminals 460 of the second external electronic device 230, a case in which the cover (e.g., the second housing structure 420 in FIG. 4) is detected as being in the closed state in the state in which the terminals 470 of the electronic device 501 (e.g., the first electronic device 211 and/or the second electronic device 213) are physically in contact with the terminals 460 of the second external electronic device 230, a case in which a designated time elapses after the cover 420 is detected as being in the closed state in the state in which the terminals 470 of the electronic device 501 (e.g., the first electronic device 211 and/or the second electronic device 213) are physically in contact with the terminals 460 of the second external electronic device 230, or a case in which the cover 420 is detected as being in the open state from the closed state in the state in which the terminals 470 of the electronic device 501 (e.g., the first electronic device 211 and/or the second electronic device 213) are physically in contact with the terminals 460 of the second external electronic device 230.

In an embodiment, on the basis that the terminals 470 of the electronic device 501 and the terminals 460 of the second external electronic device 230 are physically in contact with one another, the electronic device 501 and the second external electronic device 230 may perform power line communication (PLC).

In various embodiments, on the basis of the information on the electrical connection with the second external electronic device 230 received from the PMIC (e.g., the charging circuit 540), the processor 550 may identify whether the electronic device 501 is seated in the second external electronic device 230 and perform the power line communication (PLC) with the second external electronic device 230.

In an embodiment, the processor 550 may receive information of the second external electronic device 230 from the second external electronic device 230 through the PLC communication. For example, the information of the second external electronic device 230 may include identification information of the second external electronic device 230, state information of the second external electronic device 230, and/or information related to the firmware. For example, the identification information of the second external electronic device 230 may include a mac address, a device type, a model name, a model number, a serial number, and/or a manufacturer name. The state information of the second external electronic device 230 may include battery state information of the second external electronic device 230, temperature state information, a current process state, and/or charge state information. The information related to the firmware may include a firmware binary name, a firmware binary, and/or firmware version information.

In an embodiment, the processor 550 may identify (or determine) whether the second external electronic device 230 is required to be updated on the basis of the information of the second external electronic device 230 received through the PLC communication. For example, the electronic device 501 may identify whether the second external electronic device 230 is required to be updated on the basis of version information of the updating file for updating the second external electronic device 230 received from the first external electronic device 220, identification information of the second external electronic device 230, state information of the second external electronic device 230, and/or information related to the firmware. When the version information of the updating file for updating the second external electronic device 230 received from the first external electronic device 220 is a higher level version than the version information of the firmware installed in the second external electronic device 230, the processor 550 may identify that the second external electronic device 230 is required to be updated.

The present disclosure is not limited thereto. The processor 550 may receive, from the first external electronic device 220, a signal for requesting the identification of whether the second external electronic device 230 is required to be updated. In case that the processor 550 receives, from the first external electronic device 220, the signal for requesting the identification of whether the second external electronic device 230 is required to be updated, the processor 550 may identify that the second external electronic device 230 is required to be updated on the basis of the information of the second external electronic device 230.

In an embodiment, when it is identified that the second external electronic device 230 is required to be updated, the processor 550 may identify whether a designated condition for transmitting the updating file to the second external electronic device 230 is satisfied on the basis of the state information of the second external electronic device 230 and/or the state information of the electronic device 501. For example, the designated condition may include a case in which the electronic device 501 is seated in the second external electronic device 230, a case in which the battery residual amount of the electronic device 501 exceeds a designated value, a case in which the battery residual amount of the second external electronic device 230 exceeds a designated value, and/or a case in which sensor information of the electronic device 501 is in a stable state for a designated time (e.g., a state in which a sensor signal related to a motion is not detected after the electronic device 501 is seated in the second external electronic device 230).

In an embodiment, in case that the designated condition for transmitting the updating file to the second external electronic device 230 is satisfied, the processor 550 may transmit the updating file, which is received from the first external electronic device 220, to the second external electronic device 230.

The electronic device according to various example embodiments may include a communication circuit, a memory, at least one processor operatively connected to the communication circuit and the memory. One or more of the at least one processor may be configured to: receive the updating file for updating the second external electronic device from the first external electronic device based on the communication connection with the first external electronic device through the communication circuit; identify whether the second external electronic device is required to be updated based on the electronic device being seated in the second external electronic device; identify whether the designated condition for transmitting the updating file to the second external electronic device is satisfied based on state information of the second external electronic device and/or state information of the electronic device based on the second external electronic device being required to be updated; and transmit the updating file, received from the first external electronic device, to the second external electronic device based on the designated condition for transmitting the updating file to the second external electronic device being satisfied.

In various example embodiments, one or more of the at least one processor may be configured to transmit the information related to the second external electronic device based on the communication connection with the first external electronic device. The information related to the second external electronic device may include identification information of the second external electronic device, state information, and/or information related to the firmware installed in the second external electronic device.

In various example embodiments, one or more of the at least one processor may be configured to store at least some of the received updating files in the memory (e.g., the memory 515 of the first electronic device 211 or the memory 515 of the second electronic device 213) and transmit at least another of the received updating files to a third external electronic device (e.g., the second electronic device 213 or the first electronic device 211) in communication connection via the communication circuit.

In various example embodiments, one or more of the at least one processor may be configured to transmit a signal, requesting transmission of at least another of the updating files to the second external electronic device, to the third external electronic device (e.g., the second electronic device 213 or the first electronic device 211) based on the designated condition for transmitting the updating file to the second external electronic device being satisfied.

In various example embodiments, one or more of the at least one processor may be configured to: identify that the electronic device is seated in the second external electronic device based on the terminals of the electronic device being physically in contact with the terminals of the second external electronic device, based on the cover (e.g., the second housing structure 420 in FIG. 4) of the second external electronic device being detected as being in the closed state in the state in which the terminals of the electronic device are physically in contact with the terminals of the second external electronic device, based on a designated time elapsing after the cover is detected as being in the closed state in the state in which the terminals of the electronic device are physically in contact with the terminals of the second external electronic device, or based on the cover being detected as being in the open state from the closed state in the state in which the terminals of the electronic device are physically in contact with the terminals of the second external electronic device.

In various example embodiments, one or more of the at least one processor may be configured to perform power line communication (PLC) with the second external electronic device based on the electronic device being seated in the second external electronic device.

In various example embodiments, based on the electronic device being seated in the second external electronic device, one or more of the at least one processor may be configured to: request the information related to the second external electronic device from the second external electronic device through the power line communication and receive the information related to the second external electronic device from the second external electronic device, as a response to the request.

In various example embodiments, one or more of the at least one processor may be configured to: identify that the second external electronic device is required to be updated based on version information of the updating file received from the first external electronic device being a higher level version than version information of the firmware among the pieces of information related to the second external electronic device received from the second external electronic device.

In various example embodiments, the state information of the electronic device may include battery information and/or sensor information of the electronic device, and the state information of the second external electronic device may include battery state information and/or charge state information of the second external electronic device.

In various example embodiments, one or more of the at least one processor may be configured to: determine that the designated condition for transmitting the updating file to the second external electronic device is satisfied based on the electronic device being seated in the second external electronic device, based on the battery residual amount of the electronic device exceeding the designated value, based on the battery residual amount of the second external electronic device exceeding the designated value, based on a state in which a value of the sensor signal of the electronic device does not exceed a specified value being maintained for a designated time, and/or based on the second external electronic device being in a state of being charged.

Various example embodiments related to an operation of the electronic device 501 according to various embodiments will be described in greater detail below with reference to FIG. 7.

Figure 6:
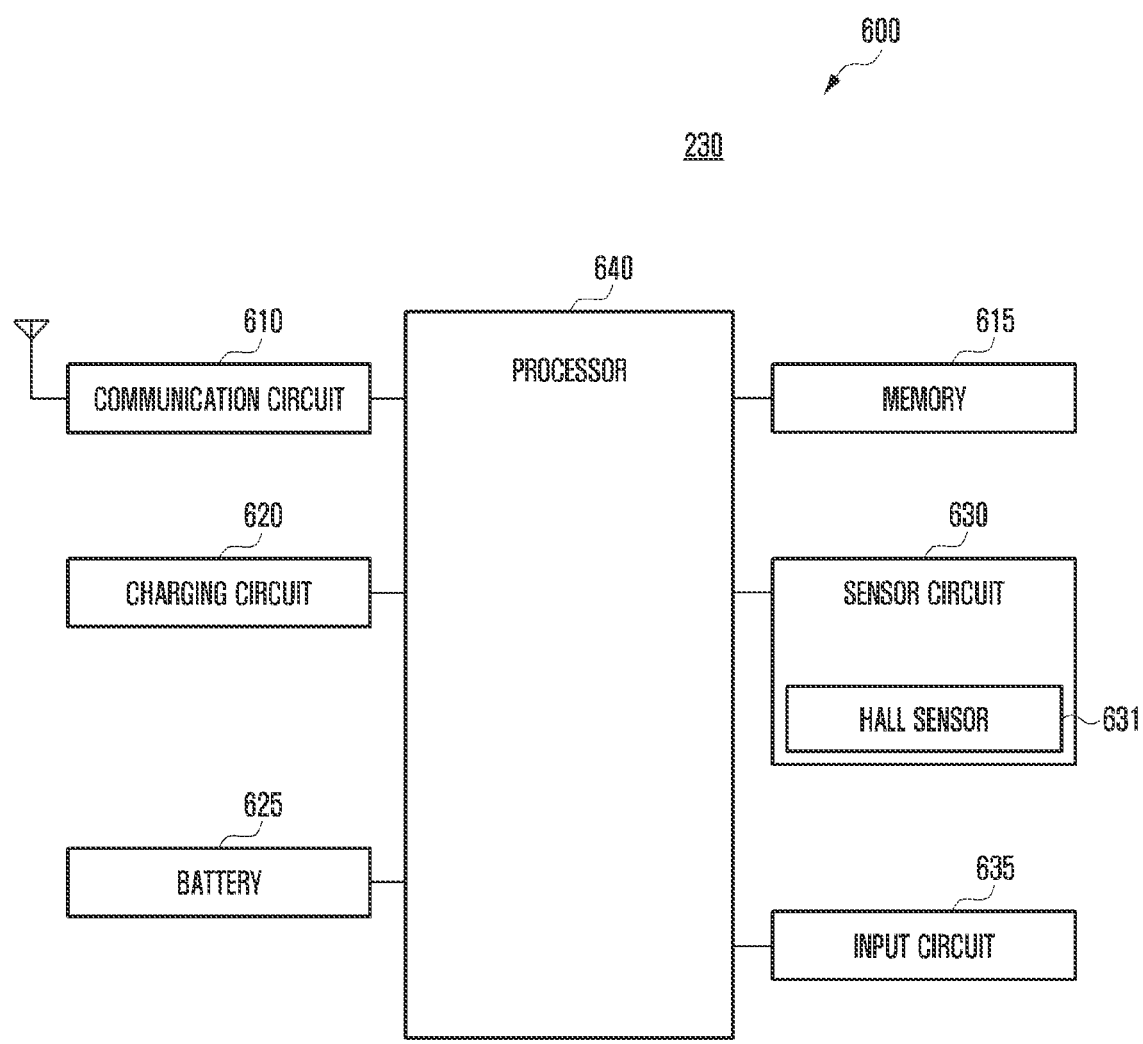
FIG. 6 is a block diagram illustrating an example configuration of the second external electronic device according to various embodiments.

FIG. 6 is a block diagram 600 illustrating an example configuration of the second external electronic device 230 according to various embodiments.

With reference to FIG. 6, the second external electronic device 230 may include a communication circuit 610, a memory 615, a charging circuit 620, a battery 625, a sensor circuit 630, an input circuit 635, and/or a processor (e.g., including processing circuitry) 640.

According to various embodiments, the communication circuit 610 may transmit data to or receive data from the electronic device (e.g., the electronic device 501 in FIG. 5 (e.g., the first electronic device 211 and/or the second electronic device 213 in FIG. 2) through the wireless communication.

According to various embodiments, the memory 615 may store data received through the communication circuit 610 of the second external electronic device 230 or information stored while the second external electronic device 230 is manufactured (e.g., the identification information of the second external electronic device 230).

In an embodiment, the memory 615 may store information for wireless communication connection between the first electronic device 211 and/or the second electronic device 213 and the second external electronic device 230. For example, the memory 615 may store address information of the first electronic device 211 and/or address information of the second electronic device 213.

According to various embodiments, the charging circuit 620 may perform an operation related to the transmission of power to the first electronic device 211 and/or the second electronic device 213 (e.g., control of a transmission rate of power) through physical/electrical connection between the first electronic device 211 and/or the second electronic device 213 and the second external electronic device 230. The second external electronic device 230 may be physically/electrically connected to the first electronic device 211 and/or the second electronic device 213 in various ways. For example, the second external electronic device 230 may have spaces (e.g., the grooves 485 in FIG. 4) into which the first electronic device 211 and/or the second electronic device 213 may be inserted.

In an embodiment, in case that the first electronic device 211 or the second electronic device 213 is inserted into the second external electronic device 230, electrical connection may occur between the terminals of the second external electronic device 230 (e.g., the terminals 460 of the second external electronic device 230 in FIG. 4) and the terminals of the first electronic device 211 (e.g., the terminals 470 of the first electronic device 211 in FIG. 4) or between the terminals of the second external electronic device 230 (e.g., the terminals 460 of the second external electronic device 230 in FIG. 4) and the terminals of the second electronic device 213.

For example, as the contact occurs between the terminal of the first electronic device 211 and the terminal of the second external electronic device 230, electrical connection may be created between the first electronic device 211 and the second external electronic device 230. The second external electronic device 230 may transmit power to the first electronic device 211 through the electrical connection between the first electronic device 211 and the second external electronic device 230, and a communication channel may be created between the first electronic device 211 and the second external electronic device 230. As the contact occurs between the terminal of the second electronic device 213 and the terminal of the second external electronic device 230, electrical connection may be created between the second electronic device 213 and the second external electronic device 230. The second external electronic device 230 may transmit power to the second electronic device 213, and a communication channel may be created between the second electronic device 213 and the second external electronic device 230.

In a embodiment, the communication channel between the first electronic device 211 and/or the second electronic device 213 and the second external electronic device 230 may include a communication channel implemented by power line communication (PLC).

According to various embodiments, the battery 625 may supply power to at least one element of the electronic device 501 (e.g., the first electronic device 211 and/or the second electronic device 213) and/or the second external electronic device 230. In an embodiment, the battery 625 may include a primary battery, which is not rechargeable, a secondary battery, which is rechargeable, and/or a fuel cell.

According to various embodiments, the sensor circuit 630 may include a Hall sensor 631 using a magnetic force. The Hall sensor 631 may detect whether the electronic device 501 (e.g., the first electronic device 211 and/or the second electronic device 213) is seated in the second external electronic device 230. The Hall sensor 631 may detect the open state and/or the closed state of the cover (e.g., the second housing structure 420 in FIG. 4) of the second external electronic device 230. The Hall sensor 631 may transmit a sensor signal, which is related to the detection of whether the electronic device 501 is seated, and a sensor signal, which is related to the open state and/or the closed state of the cover of the second external electronic device 230, to the processor 640.

According to various embodiments, the input circuit 635 may include a button for controlling the other electronic devices (e.g., the first electronic device 211, the second electronic device 213, and/or the first external electronic device 220) being in communication connection through the communication circuit 610 (e.g., controlling an operation of outputting audio signals of the first electronic device 211 and/or the second electronic device 213 and controlling the communication connection of the first external electronic device 220). For example, the button may be implemented as a pressure sensor or a touch sensor.

According to various embodiments, the processor 640 may include various processing circuitry (as used herein, including the claims, the term "processor" may include various processing circuitry, including at least one processor, wherein one or more processors of the at least one processor may be configured to perform the various functions described herein) and control various components operatively connected to various electronic components (e.g., the communication circuit 610, the memory 615, the charging circuit 620, the battery 625, the sensor circuit 630, and/or the input circuit 635), which are included in the second external electronic device 230, and operatively connected to the processor 640.

In an embodiment, the processor 640 may receive the updating file from the electronic device 501 on the basis of the detection of the seating of the electronic device 501 (e.g., the first electronic device 211 and/or the second electronic device 213). The processor 640 may store the updating file, which is received from the electronic device 501, to the memory 615. The processor 640 may identify whether the designated condition for updating the second external electronic device 230 is satisfied on the basis of the state information of the second external electronic device 230. In case that the designated condition for updating the second external electronic device 230 is satisfied, the processor 640 may update the second external electronic device 230 using the updating file received from the electronic device 501. For example, the second external electronic device 230 may identify (or determine) that the designated condition for updating the second external electronic device 230 is satisfied in a case in which the second external electronic device 230 is in the SA mode, a case in which the battery residual amount of the second external electronic device 230 exceeds a designated value, a case in which a temperature of the second external electronic device 230 is included in a designated range, a case in which the second external electronic device 230 is stably in a state of being charged, and/or a case in which a user input for updating the firmware installed in the second external electronic device 230 is detected. The second external electronic device 230 may update the second external electronic device 230 using the updating file received from the electronic device 501 on the basis that the designated condition for updating the second external electronic device 230 is satisfied.

The electronic device (e.g., the second external electronic device 230) according to various example embodiments may include a communication circuit, a sensor circuit, a memory, and at least one processor operatively connected to the communication circuit, the sensor circuit, and the memory. One or more of the at least one processor \ may be configured to: receive an updating file from at least one external electronic device (e.g., the first electronic device 211 and/or the second electronic device 213) through the communication circuit based on the seating of at least one external electronic device (e.g., the first electronic device 211 and/or the second electronic device 213) being detected by the sensor circuit; identify whether the designated condition for updating the electronic device (e.g., the second external electronic device 230) is satisfied based on state information of the electronic device (e.g., the second external electronic device 230); and update the electronic device (e.g., the second external electronic device 230) using the received updating file based on the designated condition for updating the electronic device (e.g., the second external electronic device 230) being satisfied.

In various example embodiments, one or more of the at least one processor may be configured to: receive at least some of the updating files from the first external electronic device (e.g., the first electronic device 211 or the second electronic device 213) among one or more external electronic devices (e.g., the first electronic device 211 and/or the second electronic device 213); receive at least another of the updating files from the second external electronic device (e.g., the second electronic device 213 or the first electronic device 211) among one or more external electronic devices (e.g., the first electronic device 211 and/or the second electronic device 213); and receive the updating file from one external electronic device (e.g., the first electronic device 211 or the second electronic device 213) among one or more external electronic devices (e.g., the first electronic device 211 and/or the second electronic device 213).

In various example embodiments, the state information of the electronic device (e.g., the second external electronic device 230) may include information on a communication connection state with at least one external electronic device (e.g., the first electronic device 211 and/or the second electronic device 213), battery residual amount information, temperature information of the electronic device (e.g., the second external electronic device 230), and/or charge state information of the electronic device (e.g., the second external electronic device 230).

In various example embodiments, one or more of the at least one processor may be configured to: identify that the designated condition for updating the electronic device (e.g., the second external electronic device 230) is satisfied based on a communication connection with at least one external electronic device (e.g., the first electronic device 211 and/or the second electronic device 213) being released and/or the battery residual amount exceeding a designated value, based on a temperature of the electronic device (e.g., the second external electronic device 230) being included in a designated range, based on the electronic device (e.g., the second external electronic device 230) being stably in a state of being charged, and/or based on an input for updating the electronic device (e.g., the second external electronic device 230) being detected.

The electronic device (e.g., the second external electronic device 230) according to various example embodiments may further include the indicator, and one or more of the at least one processor may be configured to output an updating progress state of the second external electronic device through the indicator.

Various embodiments related to an operation of the second external electronic device 230 according to various embodiments will be described in greater detail below with reference to FIG. 10.

Figure 7:
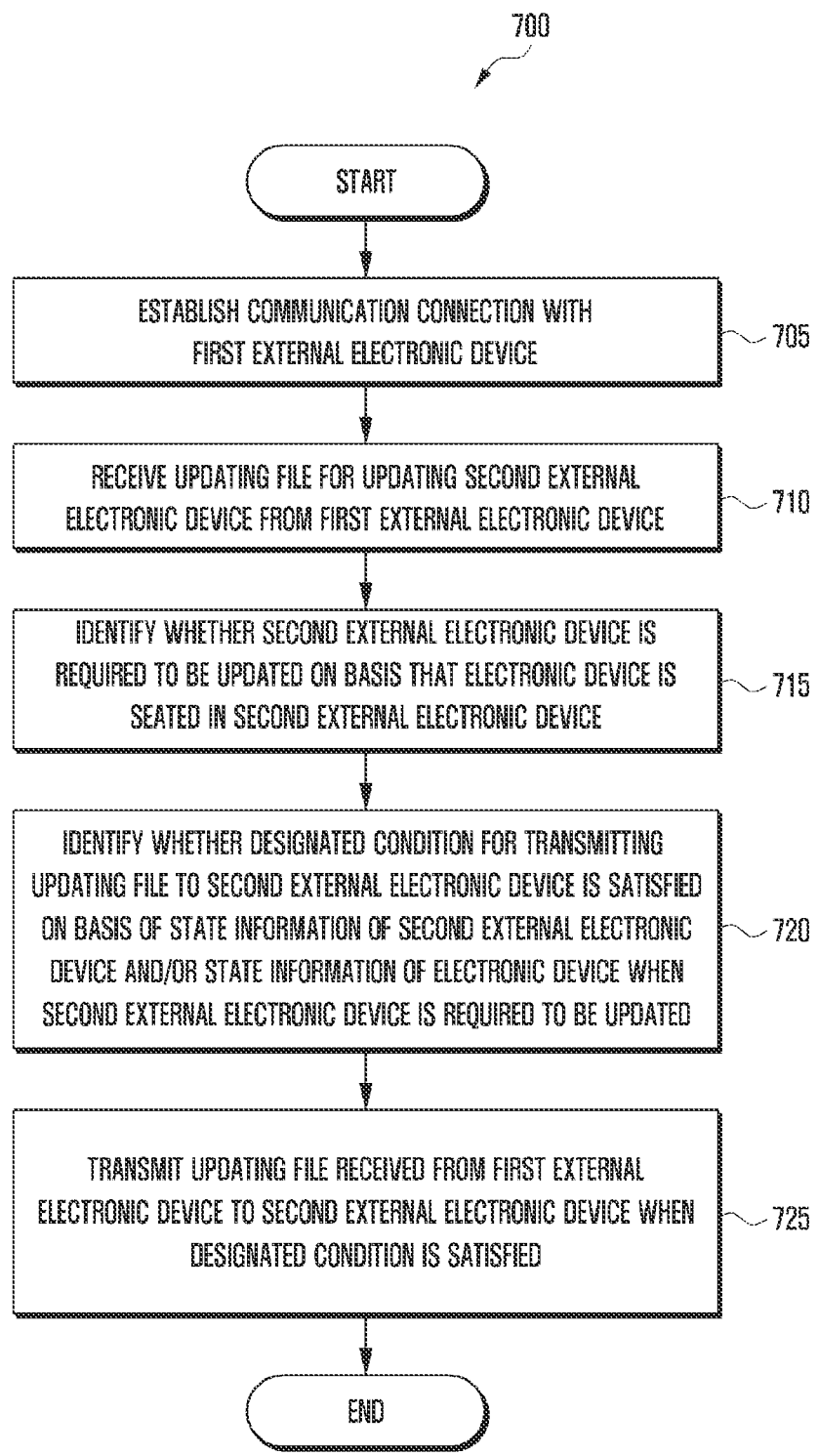
FIG. 7 is a flowchart illustrating an example method of transmitting an updating file for updating the second external electronic device to the second external electronic device using the electronic device according to various embodiments.

FIG. 7 is a flowchart 700 illustrating an example method of transmitting the updating file for updating the second external electronic device 230 using the electronic device 501 to the second external electronic device 230 according to various embodiments.

With reference to FIG. 7, at operation 705, the electronic device (e.g., the electronic device 501 in FIG. 5) (e.g., the first electronic device 211 and/or the second electronic device 213 in FIG. 2) may establish a communication connection with the first external electronic device (e.g., the electronic device 101 in FIG. 1 or the first external electronic device 220 in FIG. 2). For example, the electronic device 501, e.g., the first electronic device 211 and/or the second electronic device 213 may establish a communication connection with the first external electronic device 220 through the short-range wireless communication.

In various embodiments, as illustrated in FIG. 3, the electronic device 501 may be in communication connection with the first external electronic device 220 through the short-range wireless communication through a relay method, a sniffing method, or a true wireless stereo plus (TWS+) method.

In an embodiment, at operation 710, the electronic device 501 may receive the updating file for updating the second external electronic device 230 from the first external electronic device 220.

In an embodiment, the electronic device 501 may transfer the information, which is related to the firmware installed in the second external electronic device 230, to the first external electronic device 220 in order to update the firmware of the second external electronic device 230. For example, the electronic device 501 may transfer the information, which is related to the firmware installed in the second external electronic device 230, to the first external electronic device 220 in order to receive the updating file, which is required to update the firmware of the second external electronic device 230, from the first external electronic device 220.

In an embodiment, the information related to the firmware may include, for example, and without limitation, a firmware binary name, a firmware binary, and/or firmware version information.

In various embodiments, the electronic device 501 may transfer not only the information, which is related to the firmware installed in the second external electronic device 230, but also the information, which is related to the second external electronic device 230, to the first external electronic device 220. The information related to the second external electronic device 230 may include identification information and/or state information of the second external electronic device 230. For example, the identification information of the second external electronic device 230 may include a mac address, a device type, a model name, a model number, a serial number, and/or a manufacturer name. The state information of the second external electronic device 230 may include battery state information (e.g., battery residual amount information), temperature state information, current process state, charge state information, and/or sensor information (e.g., information on the open state and/or the closed state of the cover (e.g., the second housing structure 420 in FIG. 4)) of the second external electronic device 230.

The following <Table 1> according to various embodiments may show serial port profile (SPP) packets of the short-range wireless communication, e.g., Bluetooth communication transmitted to the first external electronic device 220 by the electronic device 501. For example, with reference to <Table 1>, on the basis of the communication connection with the first external electronic device 220, the electronic device 501 may transfer battery information (e.g., battery residual amount information) of the electronic device 501, which is included in the SPP packet, to the first external electronic device 220. The present disclosure is not limited thereto. On the basis of the communication connection with the first external electronic device 220, the electronic device 501 may transfer the information of the second external electronic device 230 (e.g., identification information of the second external electronic device 230, state information, and/or information related to the firmware), which is included in the SSP packet, to the first external electronic device 220.

TABLE 1

| SOM(1 byte) | Header LSB(1 byte) | Header MSB(1 byte) | Msg ID(2 byte) |
|---|---|---|---|
| 0xFD | 0x0A | 0x00 | 0Xa0 |
| Earbud Battery level(1 byte) | Earbud Battery level(1 byte) | EOM(1 byte) | |
| 0x 64 | 0x 64 | 0x DD | |

In an embodiment, the first external electronic device 220 may identify whether the updating file for updating the firmware installed in the second external electronic device 230 exists on the basis of the information related to the second external electronic device 230 received from the electronic device 501 and/or the information related to the firmware installed in the second external electronic device 230. For example, the first external electronic device 220 may access a server related to the firmware updating or execute an application (e.g., a manager application) related to the firmware updating. The first external electronic device 220 may identify whether the updating file for updating the firmware installed in the second external electronic device 230 exists in the server on the basis of the information related to the second external electronic device 230 received from the electronic device 501 and/or the information (e.g., firmware version information) related to the firmware. When it is identified that the updating file for updating the firmware installed in the second external electronic device 230 exists, the first external electronic device 220 may receive the updating file (e.g., the firmware binary) for updating the firmware of the second external electronic device 230 from the server (or from the server through the application related to the firmware updating) and store the updating file in the memory (e.g., the memory 130 in FIG. 1).

In various embodiments, the first external electronic device 220 may display, on a display (e.g., the display module 160 in FIG. 1), a user interface including information on the presence of the firmware updating file of the second external electronic device 230, a user interface including information for inquiring whether to download a firmware updating file, and/or a user interface including information related to the completion of downloading of the firmware updating file.

In an embodiment, the first external electronic device 220 may transmit the updating file for updating the firmware of the second external electronic device 230 to the electronic device 501. For example, the first external electronic device 220 may identify the state of the communication connection with the electronic device 501 and detect a designated event or transmit the updating file to the electronic device 501 at a designated time point. For example, the first external electronic device 220 may transmit the updating file to the electronic device 501 when a user input (e.g., a designated event) for requesting the downloading of the updating file is detected in the user interface including the information for inquiring whether to download the firmware updating file displayed on the display 160 as the firmware updating file exists.

In various embodiments, the updating file may be received by the electronic device 501, e.g., the first electronic device 211 and the second electronic device 213. The present disclosure is not limited thereto. For example, the updating file may be received by one of the first electronic device 211 and the second electronic device 213. As another example, among the updating files, the first updating file may be received by the first electronic device 211, and the second updating file may be received by the second electronic device 213.

For example, in case that the electronic device 501 and the first external electronic device 220 are in communication connection by the relay method illustrated in <310> in FIG. 3 or the sniffing method illustrated in <320> in FIG. 3, the first external electronic device 220 may transmit the updating file to one electronic device (e.g., the first electronic device 211 or the second electronic device 213) being in communication connection with the first external electronic device 220, on behalf of the first electronic device 211 and the second electronic device 213.

The present disclosure is not limited thereto. One electronic device (e.g., the first electronic device 211 or the second electronic device 213), which is representatively in communication connection with the first external electronic device 220, may divide the received updating file into the first updating file and the second updating file, for example. In this case, one electronic device (e.g., the first electronic device 211 or the second electronic device 213) may store the first updating file, among the updating files, and transmit the second updating file to the other electronic device (e.g., the second electronic device 213 or the first electronic device 211).

As still another example, in case that the electronic device 501 and the first external electronic device 220 are in communication connection by the TWS+ method illustrated in <330> in FIG. 3, the first external electronic device 220 may divide the updating file into the first updating file and the second updating file, for example. The first external electronic device 220 may transmit the first updating file, among the updating files, to the first electronic device 211 and transmit the second updating file to the second electronic device 213.

As still another example, in case that the electronic device 501 and the first external electronic device 220 are in communication connection by the TWS+ method illustrated in <330> in FIG. 3, the first external electronic device 220 may transmit the updating file to the electronic device 501, e.g., the first electronic device 211 and the second electronic device 213.

In various embodiments, the electronic device 501 may receive the updating file from the first external electronic device 220 being in communication connection in a state in which the communication connection with the second external electronic device 230 is released (e.g., a state in which the electronic device 501 is detached from the second external electronic device 230) or a state in which the communication connection with the second external electronic device 230 is established (e.g., a state in which the electronic device 501 is seated in the second external electronic device 230 and the cover (e.g., the second housing structure 420 in FIG. 4) of the second external electronic device 230 is opened).

In an embodiment, at operation 715, the electronic device 501 may identify whether the second external electronic device 230 is required to be updated on the basis that the electronic device 501 is seated in the second external electronic device 230.

In an embodiment, the electronic devices 501 (e.g., the first electronic device 211 and the second electronic device 213) may be seated in the grooves (e.g., the grooves 485 in FIG. 4) (e.g., reference numeral <410> in FIG. 4) of the first housing structure (e.g., the first housing structure 415 in FIG. 4) of the second external electronic device 230. For example, the electronic device 501 may use sensor information acquired through the sensor circuit (e.g., the sensor circuit 530 in FIG. 5) of the electronic device 501 and identify a state in which the electronic device 501 is seated in the second external electronic device 230 or detached from the second external electronic device 230 (e.g., reference numeral <450> in FIG. 4). For example, the first electronic device 211 and the second electronic device 213 may exchange sensor information with each other. On the basis of the state information, the electronic devices 211 and 213 may each identify the state in which each of the electronic devices 211 and 213 is seated in the second external electronic device 230 or detached from the second external electronic device 230.

In various embodiments, the state in which at least one electronic device (e.g., the first electronic device 211 and/or the second electronic device 213) is seated in the second external electronic device 230 may include the state in which the cover of the second external electronic device 230 is closed or opened in the state in which the terminals of the first electronic device 211 (e.g., the terminals 470 in FIG. 4) (and/or the terminals of the second electronic device 213) are physically in contact with the terminals of the second external electronic device 230 (e.g., the terminals 460 in FIG. 4) and/or the state in which the terminals 470 of the first electronic device 211 (and/or the terminals of the second electronic device 213) are physically in contact with the terminals 460 of the second external electronic device 230.

In an embodiment, on the basis that the terminals 470 of the electronic device 501 and the terminals 460 of the second external electronic device 230 are physically in contact with one another, the electronic device 501 and the second external electronic device 230 may perform power line communication (PLC).

In an embodiment, the first electronic device 211 and the second electronic device 213 may independently perform the PLC communication with the second external electronic device 230. For example, the first electronic device 211 and the second electronic device 213 may independently perform an operation of exchanging information (e.g., information on a connected or disconnected state between the first electronic device 211 and/or the second electronic device 213 and the external electronic device 230 and/or information related to the second external electronic device 230) with the second external electronic device 230 through the PLC communication.

In an embodiment, the electronic device 501 may receive information of the second external electronic device 230 from the second external electronic device 230 through the PLC communication. For example, the information of the second external electronic device 230 may include identification information of the second external electronic device 230, state information of the second external electronic device 230, and/or information related to the firmware. For example, the identification information of the second external electronic device 230 may include a mac address, a device type, a model name, a model number, a serial number, and/or a manufacturer name. The state information of the second external electronic device 230 may include battery state information of the second external electronic device 230, temperature state information, a current process state, and/or charge state information. The information related to the firmware may include a firmware binary name, a firmware binary, and/or firmware version information.

In an embodiment, the electronic device 501 may identify whether the second external electronic device 230 is required to be updated on the basis of the information of the second external electronic device 230 received through the PLC communication. For example, the electronic device 501 may identify whether the second external electronic device 230 is required to be updated on the basis of version information of the updating file for updating the second external electronic device 230 received from the first external electronic device 220, identification information of the second external electronic device 230, state information of the second external electronic device 230, and/or information related to the firmware. For example, when the version information of the updating file for updating the second external electronic device 230 received from the first external electronic device 220 is a higher level version than the version information of the firmware installed in the second external electronic device 230, the electronic device 501 may identify that the second external electronic device 230 is required to be updated.

In various embodiments, the electronic device 501 may identify whether the second external electronic device 230 is required to be updated on the basis of the information related to the second external electronic device 230 at a designated time point. The designated time point may include a time point at which the electronic device 501 is seated in the second external electronic device 230. For example, the time point at which the electronic device 501 is seated in the second external electronic device 230 may include a time point at which the terminals (e.g., the terminals 470 in FIG. 4) of the electronic device 501 (e.g., the first electronic device 211 and/or the second electronic device 213) are physically in contact with the terminals (e.g., the terminals 460 in FIG. 4) of the second external electronic device 230, a time point at which the cover (e.g., the second housing structure 420 in FIG. 4) is detected as being in the closed state in the state in which the terminals 470 of the electronic device 501 (e.g., the first electronic device 211 and/or the second electronic device 213) are physically in contact with the terminals 460 of the second external electronic device 230, a time point at which a designated time elapses after the cover 420 is detected as being in the closed state in the state in which the terminals 470 of the electronic device 501 (e.g., the first electronic device 211 and/or the second electronic device 213) are physically in contact with the terminals 460 of the second external electronic device 230, or a time point at which the cover 420 is detected as being in the open state from the closed state in the state in which the terminals 470 of the electronic device 501 (e.g., the first electronic device 211 and/or the second electronic device 213) are physically in contact with the terminals 460 of the second external electronic device 230. The present disclosure is not limited thereto. The designated time point may include a time point at which a designated time elapses after the processor 550 of the electronic device 501 is booted up as the processor 550, which is in a sleep mode state of the electronic device 501, changes in state of charge with the second external electronic device 230 (e.g., a state switches from a charging-off state to a charging-on state) in the state in which the electronic device 501 is seated in the second external electronic device 230.

The following <Table 2> according to various embodiments may show packets of the PLC communication transmitted to the second external electronic device 230 by the electronic device 501. With reference to the following <Table 2>, the electronic device 501 may transmit, to the second external electronic device 230, information indicating that the updating file for updating the firmware installed in the second external electronic device 230 exists, temperature information, version information of the firmware, information on the type of electronic device 501 (e.g., left/right wireless audio devices), peer connection information related to the communication connection state between the first electronic device 211 and the second electronic device 213, and/or a charging type indicating whether the current state is a state in which the charging is required, which are included in the packet.

In various embodiments, the electronic device 501 may transmit the packets of the PLC communication according to the following <Table 2> to the second external electronic device 230 on the basis that the electronic device 501 is seated in the second external electronic device 230.

TABLE 2

| PLC bit(8 bit/1 Byte) | | | | | | | |
|---|---|---|---|---|---|---|---|
| 7 bit | 6 bit | 5 bit | 4 bit | 3 bit | 2 bit | 1 bit | 0 bit |
| update possible | normal temperature | version | | | L/R Type | peer connection | charging type |
| 1 | 1 | 1 | 0 | 1 | 0 | 0 | 1 |

In an embodiment, at operation 720, when it is identified that the second external electronic device 230 is required to be updated, the electronic device 501 may identify whether a designated condition for transmitting the updating file to the second external electronic device 230 is satisfied on the basis of the state information of the second external electronic device 230 and/or the state information of the electronic device 501.

In an embodiment, the electronic device 501 may identify whether a designated condition for transmitting the updating file to the second external electronic device 230 is satisfied on the basis of the information related to the updating file received from the first external electronic device 220 and identification information and/or state information of the second external electronic device 230 received from the second external electronic device 230 through the PLC communication. The designated condition may include a case in which the electronic device 501 is seated in the second external electronic device 230, a case in which the battery residual amount of the electronic device 501 exceeds a designated value, a case in which the battery residual amount of the second external electronic device 230 exceeds a designated value, and/or a case in which sensor information of the electronic device 501 is in a stable state for a designated time (e.g., a state in which a sensor signal related to a motion is not detected after the electronic device 501 is seated in the second external electronic device 230).

In an embodiment, at operation 725, in case that the designated condition for transmitting the updating file to the second external electronic device 230 is satisfied, the electronic device 501 may transmit the updating file, which is received from the first external electronic device 220, to the second external electronic device 230. For example, in case that the designated condition for transmitting the updating file to the second external electronic device 230 is satisfied, the electronic device 501 may transmit the updating file (e.g., the firmware binary) to the second external electronic device 230 through the PLC communication.

As described above with reference to operation 710 according to various embodiments, the updating file for updating the second external electronic device 230 may be stored in the first electronic device 211 and/or the second electronic device 213.

In an embodiment, in case that the updating file is stored in one of the first electronic device 211 and the second electronic device 213, one electronic device, which stores the updating file, may transmit the updating file to the second external electronic device 230 through the PLC communication on the basis that the designated condition for transmitting the updating file to the second external electronic device 230 is satisfied.

In various embodiments, the configuration has been described in which one electronic device, which stores the updating file, transmits the updating file to the second external electronic device 230 through the PLC communication. However, the present disclosure is not limited thereto. One electronic device, which stores the updating file, may transmit the updating file to the second external electronic device 230 through another wireless communication (e.g., Bluetooth communication) other than the PLC communication.

In an embodiment, in case that the first updating file, among the updating files, is stored in the first electronic device 211 and the second updating file is stored in the second electronic device 213, the first electronic device 211 may transmit the first updating file to the second external electronic device 230 through the PLC communication on the basis that the designated condition for transmitting the updating file to the second external electronic device 230 is satisfied. The second electronic device 213 may transmit the second updating file to the second external electronic device 230 through the PLC communication on the basis that the designated condition for transmitting the updating file to the second external electronic device 230 is satisfied.

A time point at which whether the second external electronic device 230 according to various embodiments is required to be updated is identified, a time point at which the updating file is transmitted to the second external electronic device 230, and/or a time point at which the second external electronic device 230 is updated may be identical to or different from one another.

The present disclosure is not limited thereto. For example, the electronic device 501 may use an application (e.g., a manager application) related to the updating of the firmware installed in the first external electronic device 220 and configure the time point at which whether the second external electronic device 230 is required to be updated is identified, the time point at which the updating file is transmitted to the second external electronic device 230, and/or the time point at which the second external electronic device 230 is updated. The electronic device 501 may identify whether the second external electronic device 230 is required to be updated and/or transmit the updating file to the second external electronic device 230 on the basis of the configured time point at which whether the second external electronic device 230 is required to be updated is identified and/or the time point at which the updating file is transmitted to the second external electronic device 230. The second external electronic device 230 may update the second external electronic device 230 on the basis of the configured time point at which the second external electronic device 230 is updated.

As another example, on the basis of a user input detected by the user interface related to the application (e.g., manager application) related to the firmware updating, the electronic device 501 may identify whether the second external electronic device 230 is required to be updated and/or transmit the updating file to the second external electronic device 230. The second external electronic device 230 may update the second external electronic device 230 on the basis of the user input detected by the user interface associated with the application (e.g., manager application) related to the firmware updating.

As still another example, in case that a guide for updating the second external electronic device 230 exists, the electronic device 501 may identify whether the second external electronic device 230 is required to be updated and/or transmit the updating file to the second external electronic device 230 on the basis of the guide. The second external electronic device 230 may update the second external electronic device 230 on the basis of the guide.

A method of updating the external electronic device (e.g., the second external electronic device 230) using the electronic device according to various example embodiments may include: receiving the updating file for updating the second external electronic device from the first external electronic device based on the communication connection with the first external electronic device; identifying whether the second external electronic device is required to be updated based on the electronic device being seated in the second external electronic device; identifying whether the designated condition for transmitting the updating file to the second external electronic device is satisfied based on state information of the second external electronic device and/or based on state information of the electronic device based on the second external electronic device being required to be updated; and transmitting the updating file, received from the first external electronic device, to the second external electronic device based on the designated condition for transmitting the updating file to the second external electronic device being satisfied.

The method of updating the external electronic device (e.g., the second external electronic device 230) using the electronic device according to various example embodiments may further include: transmitting the information related to the second external electronic device based on the communication connection with the first external electronic device.

In various example embodiments, the information related to the second external electronic device may include identification information of the second external electronic device, state information, and/or information related to the firmware installed in the second external electronic device.

In various example embodiments, the identifying of whether the second external electronic device is required to be updated may include: identifying that the electronic device is seated in the second external electronic device based on terminals of the electronic device being physically in contact with terminals of the second external electronic device, based on a cover (e.g., the second housing structure 420 in FIG. 4) of the second external electronic device being detected as being in a closed state in the state in which the terminals of the electronic device are physically in contact with the terminals of the second external electronic device 230, based on a designated time elapsing after the cover is detected as being in the closed state in the state in which the terminals of the electronic device are physically in contact with the terminals of the second external electronic device, or based on the cover being detected as being in the open state from the closed state in the state in which the terminals of the electronic device are physically in contact with the terminals of the second external electronic device; and performing power line communication (PLC) with the second external electronic device based on the electronic device being seated in the second external electronic device.

In various example embodiments, the identifying of whether the second external electronic device is required to be updated may include: requesting the information related to the second external electronic device from the second external electronic device through the power line communication based on the electronic device being seated in the second external electronic device; receiving the information related to the second external electronic device from the second external electronic device as a response to the request; and identifying that the second external electronic device is required to be updated based on the version information of the updating file received from the first external electronic device being a higher level version than the version information of the firmware among the pieces of information related to the second external electronic device received from the second external electronic device.

In various example embodiments, the identifying of whether the designated condition for transmitting the updating file to the second external electronic device is satisfied may include: determining that the designated condition for transmitting the updating file to the second external electronic device is satisfied based on the electronic device being seated in the second external electronic device, based on a battery residual amount of the electronic device exceeding a designated value, based on the battery residual amount of the second external electronic device exceeding the designated value, based on a state in which a value of the sensor signal of the electronic device does not exceed a specified value being maintained for a designated time, and/or based on the second external electronic device being in a state of being charged.

Figure 8:
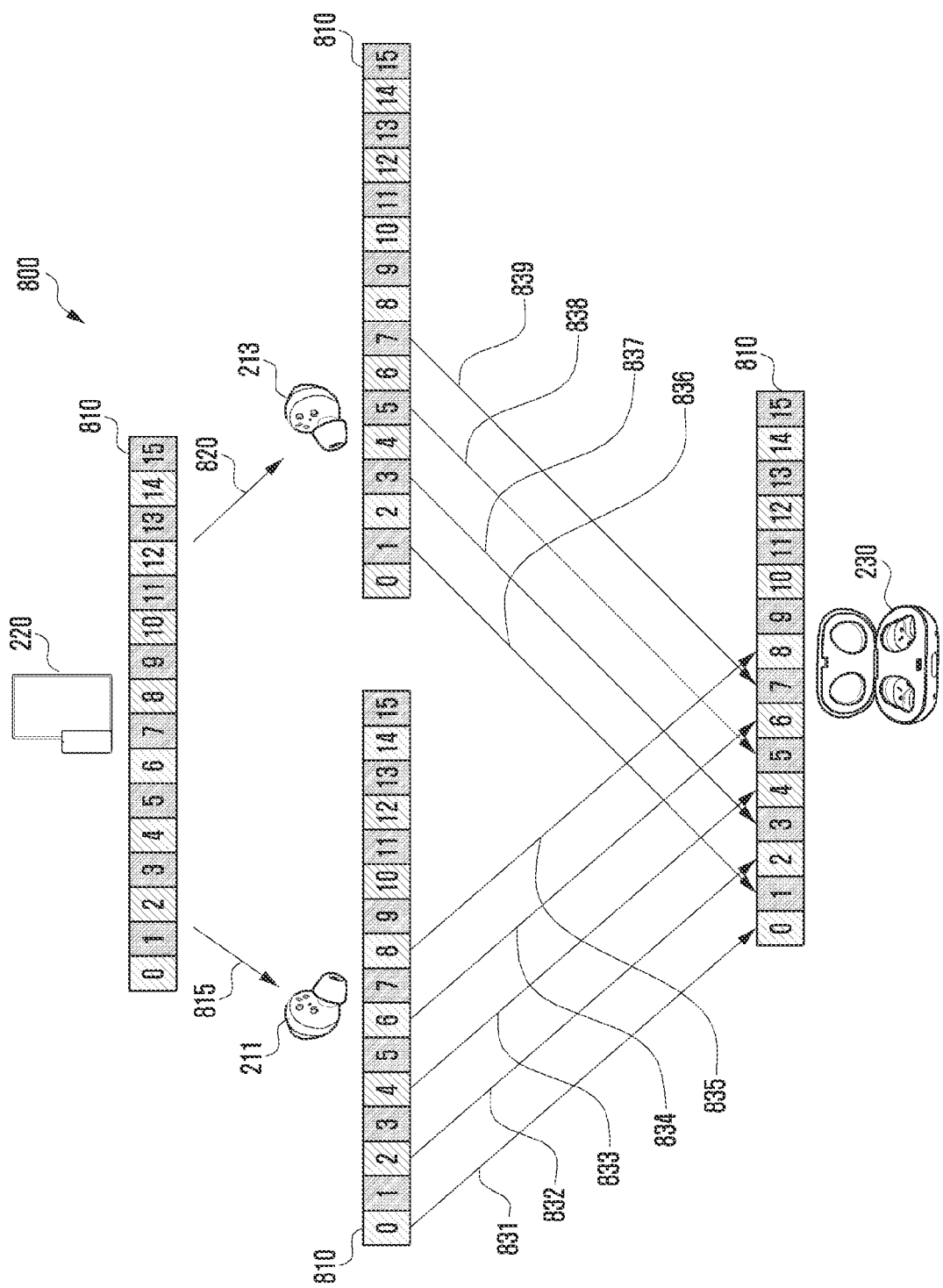
FIGS. 8 and 9 are diagrams illustrating example operations in FIG. 7 according to various embodiments.
Figure 9:
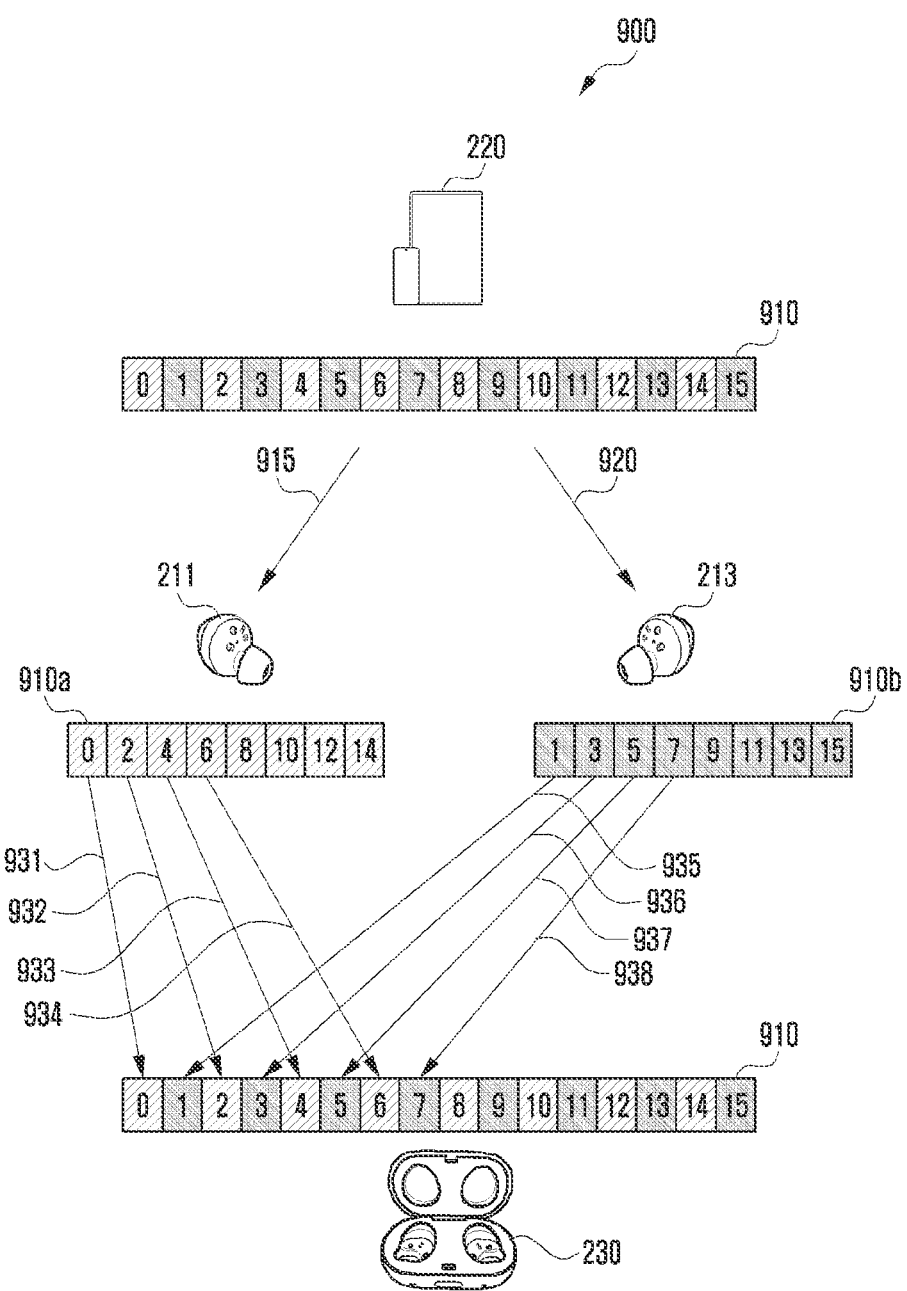

FIGS. 8 and 9 are diagrams 800 and 900 illustrating example operations 710 and 725 in FIG. 7 according to various embodiments.

In various embodiments, the electronic device (e.g., the electronic device 501 in FIG. 5) (e.g., the first electronic device (e.g., the first electronic device 211 in FIG. 2) and/or the second electronic device (e.g., the second electronic device 213 in FIG. 2) may receive at least some of the updating files for updating the second external electronic device 230 from the first external electronic device 220 (e.g., operation 710 in FIG. 7. The electronic device 501 (e.g., the first electronic device 211 and/or the second electronic device 213) may transmit at least some of the updating files to the second external electronic device 230 through the PLC communication (e.g., operation 725 in FIG. 7) in a case in which the designated condition for transmitting the updating file to the second external electronic device 230 is satisfied (e.g., in the state in which the electronic device is seated in the second external electronic device 230), a case in which the battery residual amount of the electronic device 501 exceeds a designated value, a case in which the battery residual amount of the second external electronic device 230 exceeds a designated value, and/or a case in which sensor information of the electronic device 501 is in a stable state for a designated time (e.g., a state in which a sensor signal related to a motion is not detected after the electronic device 501 is seated in the second external electronic device 230).

Hereinafter, an example configuration for receiving at least some of the updating files for the second external electronic device 230 from the first external electronic device 220 and the operation of the electronic device 501, which transmits at least some of the updating files to the second external electronic device 230, will be described in greater detail.

In FIG. 8 according to various embodiments, a description will be made on the assumption that the electronic devices 501, e.g., the first electronic device 211 and the second electronic device 213 receive the same updating file 810 from the first external electronic device 220.

With reference to FIG. 8, in an embodiment, the first external electronic device 220 may download the updating file 810 for updating the second external electronic device 230 from the server and store the updating file 810 in the memory (e.g., the memory 130 in FIG. 1). For example, the updating file 810 may divide the data into a plurality of data (e.g., 0th data to 15th data) and store the plurality of data in the memory 130. However, the present disclosure is not limited thereto.

In an embodiment, the first electronic device 211 may receive (815) the updating file 810 (e.g., 0th data to 15th data) from the first external electronic device 220 and store the received updating file 810 in the memory (e.g., the memory 515 in FIG. 5) of the first electronic device 211. The second electronic device 213 may receive (820) the updating file 810 (e.g., 0th data to 15th data) from the first external electronic device 220 and store the received updating file 810 in the memory (e.g., the memory 515 in FIG. 5) of the second electronic device 213.

In an embodiment, the first electronic device 211 and/or the second electronic device 213 may transmit at least some of the updating files 810 to the second external electronic device 230 in case that the designated condition for transmitting the updating file 810 to the second external electronic device 230 is satisfied. For example, the first electronic device 211 may transmit (831, 832, 833, 834, 835, . . . ) at least some data, e.g., even-numbered data (e.g., 0th data, 2nd data, 4th data, 6th data, 8th data, . . . , 14th data), among the updating files 810 stored in the memory 515 of the first electronic device 211, to the second external electronic device 230. The second electronic device 213 may transmit (836, 837, 838, 839, . . . ) at least some of the remaining data, e.g., odd-numbered data (e.g., 1st data, 3rd data, 5th data, 7th data, . . . , 15th data), among the updating files 810 stored in the memory 515 of the second electronic device 213, to the second external electronic device 230.

In an embodiment, the second external electronic device 230 may store the even-numbered data (e.g., 0th data, 2nd data, 4th data, 6th data, 8th data, . . . , 14th data), which is received from the first electronic device 211, at even-numbered address numbers (e.g., address number 0, address number 2, address number 4, address number 6, address number 8, . . . , address number 14), among address numbers, in the memory (e.g., the memory 615 in FIG. 6) of the second external electronic device 230. The second external electronic device 230 may store the odd-numbered data (e.g., 1st data, 3rd data, 5th data, 7th data, . . . , 15th data), which received from the second electronic device 213, at odd-numbered address numbers (e.g., address number 1, address number 3, address number 5, address number 7, . . . , address number 15), among the address numbers, in the memory 615 of the second external electronic device 230.

In an embodiment, the second external electronic device 230 may update the second external electronic device 230 using the updating file 810 (e.g., 0th data to 15th data) received from the first electronic device 211 and/or the second electronic device 213 and stored in the memory 615.

In FIG. 8 according to various embodiments, the configuration has been described in which the first electronic device 211 and the second electronic device 213 each receive all the updating files 810 (e.g., 0th data to 15th data) from the first external electronic device 220 and store the updating files 810 in the memory 515. However, the present disclosure is not limited thereto. For example, although not illustrated, the updating file 810 may be received by one electronic device 211 or 213 of the first electronic device 211 and the second electronic device 213. In this case, one electronic device 211 or 213, which receives the update file 810 from the first external electronic device 220 and stores the update file 810, may transmit the updating file 810 to the second external electronic device 230 in case that the designated condition for transmitting the updating file 810 to the second external electronic device 230 is satisfied.

In FIG. 8 according to various embodiments, a configuration has been described in which the second external electronic device 230 receives and stores at least some (e.g., even-numbered data) of the updating files 810 from the first electronic device 211 and receives and stored at least some (e.g., odd-numbered data) of the updating files 810 from the second electronic device 213 in case that the first electronic device 211 and the second electronic device 213 each store all the updating files 810 (e.g., 0th data to 15th data). However, the present disclosure is not limited thereto. For example, although not illustrated, the second external electronic device 230 may receive 0th data to 15th data included in the updating file 810 from one electronic device 211 or 213 of the first electronic device 211 and the second electronic device 213. In an embodiment, the second external electronic device 230 may receive 0th data to 15th data, in a lump, included in the updating file 810 or receive a designed number of divided data from one electronic device 211 or 213.

In FIG. 9 according to various embodiments, a description will be made on the assumption that the electronic device 501, e.g., the first electronic device 211 receives at least some (e.g., a first updating file 910a (e.g., even-numbered data)) of updating files 910 (e.g., 0th data to 15th data) from the first external electronic device 220, and the second electronic device 213 receives at least some (e.g., a second updating file 910b (e.g., odd-numbered data)) of the updating files 910 from the first external electronic device 220.

With reference to FIG. 9, in an embodiment, the first electronic device 211 may receive (915) the first updating file 910a from the first external electronic device 220. The first updating file 910a may include the even-numbered data, e.g., 0th data, 2nd data, 4th data, 6th data, . . . , 14th data. The first electronic device 211 may sequentially store the first updating files 910a, which include 0th data, 2nd data, 4th data, 6th data, . . . , 14th data received from the first external electronic device 220, in the memory 515 of the first electronic device 211. The second electronic device 213 may receive (920) the second updating file 910b from the first external electronic device 220 (or the first electronic device 211). The second updating file 910b may include the odd-numbered data, e.g., 1st data, 3rd data, 5th data, 7th data, . . . 15th data. The second electronic device 213 may sequentially store the second updating files 910b, which include 1st data, 3rd data, 5th data, 7th data, . . . , 15th data received from the first external electronic device 220, in the memory 515 of the second electronic device 213.

In an embodiment, the first electronic device 211 and the second electronic device 213 may transmit the updating files 910a and 910b to the second external electronic device 230 in case that the designated condition for transmitting the updating files 910a and 910b to the second external electronic device 230 is satisfied. For example, the first electronic device 211 may transmit (931, 932, 933, 934, . . . ) the first updating file 910a stored in the memory 515 of the first electronic device 211 to the second external electronic device 230. The second electronic device 213 may transmit (935, 936, 937, 938, . . . ) the second updating file 910b stored in the memory 515 of the second electronic device 213 to the second external electronic device 230.

In an embodiment, the second external electronic device 230 may store the first updating file 910a (e.g., even-numbered data (e.g., 0th data, 2nd data, 4th data, 6th data, . . . , 14th data)), which is received from the first electronic device 211, at even-numbered address numbers (e.g., address number 0, address number 2, address number 4, address number 6, . . . , address number 14), among the address numbers, in the memory 615 of the second external electronic device 230. The second external electronic device 230 may store the second updating file 910b (e.g., odd-numbered data (e.g., 1st data, 3rd data, 5th data, 7th data, . . . , 15th data)), which is received from the second electronic device 213, at odd-numbered address numbers (e.g., address number 1, address number 3, address number 5, address number 7, . . . , address number 15), among the address numbers, in the memory 615 of the second external electronic device 230.

In an embodiment, the second external electronic device 230 may update the second external electronic device 230 using the updating file 910 (e.g., 0th data to 15th data) including the first updating file 910a and the second updating file 910b received from the first electronic device 211 and the second electronic device 213 and stored in the memory 615.

In FIG. 9 according to various embodiments, a configuration has been described in which the first updating file 910a includes the even-numbered data, and the second updating file 910b includes the odd-numbered data. However, the present disclosure is not limited thereto. For example, in various embodiments, the first updating file 910a may include 0th data to 7th data, and the second updating file 910b may include 8th data to 15th data. In this case, the second external electronic device 230 may store the first updating file 910a, which includes 0th data to 7th data received from the first electronic device 211, at address numbers 0 to 7 among the address numbers in the memory 615 of the second external electronic device 230 and store the second updating file 910b, which includes 8th data to 15th data received from the second electronic device 213, at address numbers 8 to 15 among the address numbers in the memory 615 of the second external electronic device 230.

In various embodiments, the updating file 910 may be divided into the first updating file 910a and the second updating file 910b, and the second external electronic device 230 may quickly receive the updating file for updating the firmware by simultaneously receiving the updating files (e.g., the first updating file 910a and the second updating file 910b) stored in the respective electronic devices (e.g., the first electronic device 211 and the second electronic device 213).

In various embodiments, although not illustrated, a change to a state in which the transmission is impossible (e.g., the transmission of the updating file (e.g., the first updating file 910a) is stopped on the basis that the first electronic device 211 is detached from the second external electronic device 230) may be detected while one electronic device (e.g., the first electronic device 211) of the first electronic device 211 and the second electronic device 213 transmits the updating file (e.g., the first updating file 910a) through the first PLC communication. For example, the first electronic device 211 and the second electronic device 213 may exchange information with each other, and the second electronic device 213 may identify a state in which the transmission of the updating file is stopped on the basis of the information received from the first electronic device 211.

In this case, the second electronic device 213 may then transmit the updating file (e.g., the second updating file 910*b*) to the second external electronic device 230 through the second PLC communication.

In various embodiments, although not illustrated, in case that the updating files 810 and 910 are stored in one electronic device (e.g., the first electronic device 211 or the second electronic device 213) of the first electronic device 211 and the second electronic device 213, one electronic device (e.g., the first electronic device 211 or the second electronic device 213), which stores the updating files, may transmit the updating files 810 and 910 to the second external electronic device 230 through the PLC communication (e.g., the first PLC communication or the second PLC communication) on the basis that the designated condition for transmitting the updating file to the second external electronic device 230 is satisfied.

Figure 10:
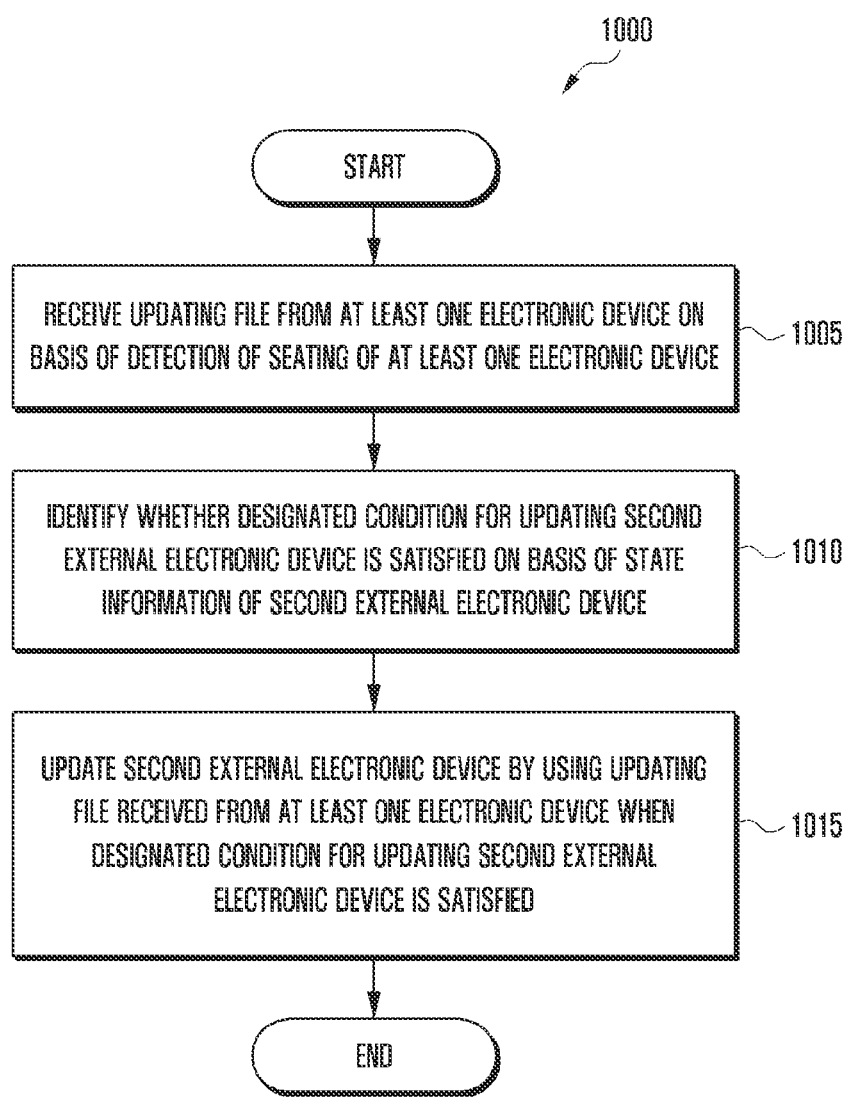
FIG. 10 is a flowchart illustrating an example method of updating the second external electronic device according to various embodiments.

FIG. 10 is a flowchart 1000 illustrating an example method of updating the second external electronic device 230 according to various embodiments.

With reference to FIG. 10, at operation 1005, the second external electronic device (e.g., the second external electronic device 230 in FIG. 6) may receive the updating file from at least one electronic device (e.g., the first electronic device 211 and/or the second electronic device 213 in FIG. 2) on the basis of the detection of the seating of at least one electronic device (e.g., the first electronic device 211 and/or the second electronic device 213 in FIG. 2).

In various embodiments, the state in which at least one electronic device (e.g., the first electronic device 211 and the second electronic device 213) is seated in the second external electronic device 230 may include the state in which the cover of the second external electronic device 230 is closed or opened in the state in which the terminals of the first electronic device 211 (e.g., the terminals 470 in FIG. 4) (and/or the terminals of the second electronic device 213) are physically in contact with the terminals of the second external electronic device 230 (e.g., the terminals 460 in FIG. 4) and/or the state in which the terminals 470 of the first electronic device 211 (and/or the terminals of the second electronic device 213) are physically in contact with the terminals 460 of the second external electronic device 230.

In various embodiments, as described above with reference to operation 725 in FIG. 7, the second external electronic device 230 may receive the updating file through the PLC communication from the electronic device 501 (e.g., the first electronic device 211 and/or the second electronic device 213) on the basis that the designated condition for transmitting the updating file to the second external electronic device 230 is satisfied is determined by the electronic device 501.

For example, the designated condition may include a case in which the electronic device 501 is seated in the second external electronic device 230, a case in which the battery residual amount of the electronic device 501 exceeds a designated value, a case in which the battery residual amount of the second external electronic device 230 exceeds a designated value, a case in which sensor information of the electronic device 501 is in a stable state for a designated time (e.g., a state in which a sensor signal related to a motion is not detected after the electronic device 501 is seated in the second external electronic device 230), and/or a case in which the second external electronic device 230 is stably in a state of being charged. The present disclosure is not limited thereto. The second external electronic device 230 may receive the updating file through the PLC communication from the electronic device 501 (e.g., the first electronic device 211 and/or the second electronic device 213) on the basis of the detection of the user input for requesting the updating file.

In an embodiment, the second external electronic device 230 may store the updating file, which is received from at least one electronic device (e.g., the first electronic device 211 and/or the second electronic device 213), in the memory (e.g., the memory 615 in FIG. 6).

In an embodiment, at operation 1010, the second external electronic device 230 may identify whether the designated condition for updating the second external electronic device 230 is satisfied on the basis of the state information of the second external electronic device 230.

For example, on the basis that the communication connection with at least one electronic device (e.g., the first electronic device 211 and/or the second electronic device 213) is released (e.g., the first electronic device 211 and the second electronic device 213 are detached from the second external electronic device 230), the designated condition for updating the second external electronic device 230 may include whether the second external electronic device 230 is in a stand-alone (SA) mode, whether a battery residual amount of the second external electronic device 230 exceeds a designated value, whether a temperature of the second external electronic device 230 exceeds a designated range, whether the second external electronic device 230 is in a state of being stably charged, and/or whether a user input for updating the firmware installed in the second external electronic device 230 through an input device (not illustrated) separately provided in the second external electronic device 230 is detected.

The present disclosure is not limited thereto. The designated condition may include a case in which the electronic device 501 and the first external electronic device 220 receive the user input for updating the second external electronic device 230 from the first external electronic device 220 through the electronic device 501 in the state in which the electronic device 501 and the first external electronic device 220 are in communication connection.

Figure 13A:
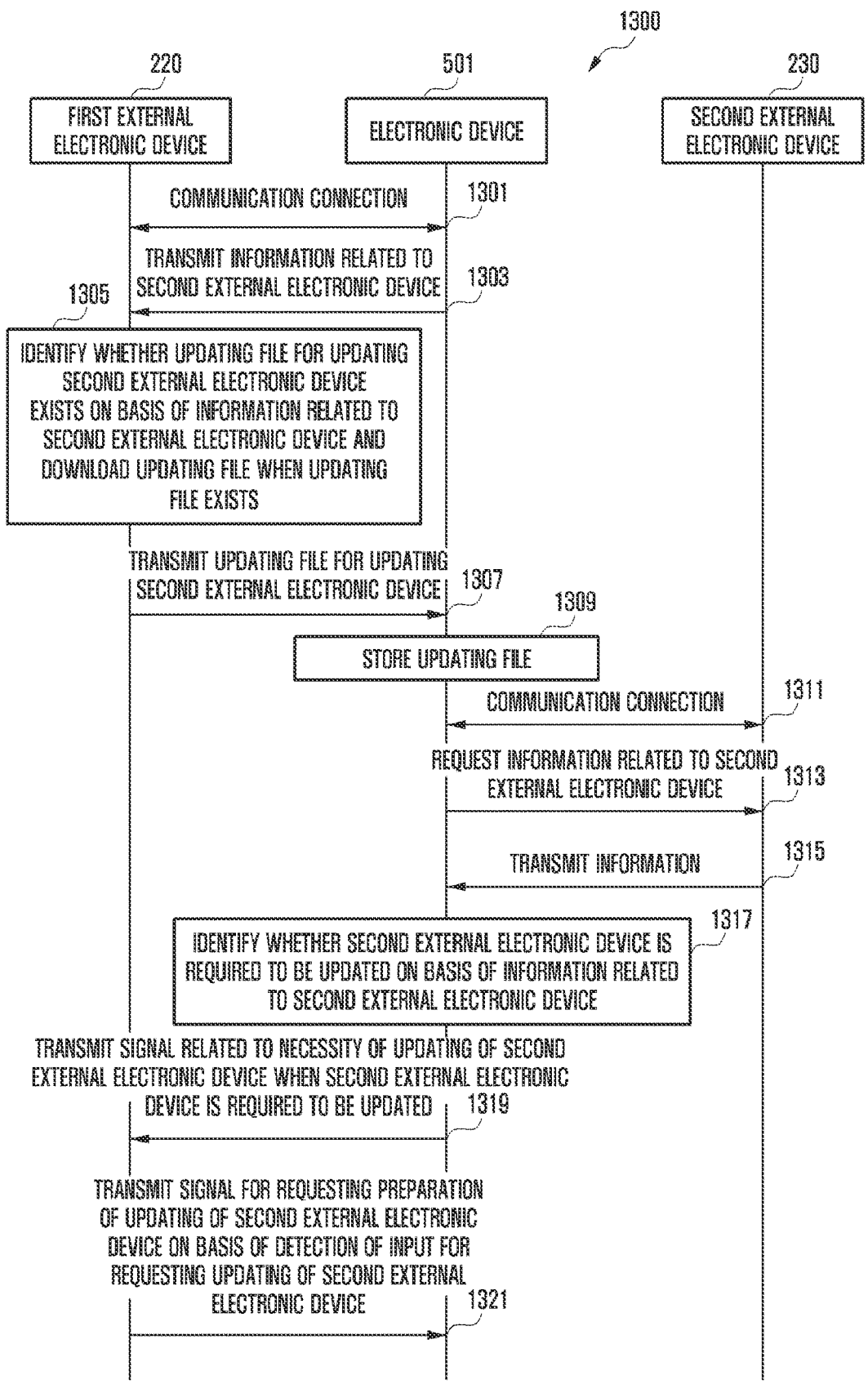

Various embodiments related to the configuration in which the second external electronic device 230 is updated in case that the electronic device 501 and the first external electronic device 220 according to various embodiments receive the user input for updating the second external electronic device 230 from the first external electronic device 220 through the electronic device 501 in the state in which the electronic device 501 and the first external electronic device 220 are in communication connection will be described in greater detail below with reference to FIGS. 13A and 13B.

In an embodiment, at operation 1015, the second external electronic device 230 may update the second external electronic device 230 using the updating file received from at least one electronic device (e.g., the first electronic device 211 and/or the second electronic device 213) in case that the designated condition for updating the second external electronic device 230 is satisfied.

In an embodiment, the second external electronic device 230 may identify that the designated condition for updating the second external electronic device 230 is satisfied in a case in which the second external electronic device 230 is in the SA mode, a case in which the battery residual amount of the second external electronic device 230 exceeds a designated value, a case in which a temperature of the second external electronic device 230 is included in a designated range, a case in which the second external electronic device 230 is stably in a state of being charged, and/or a case in which a user input for updating the firmware installed in the second external electronic device 230 is detected.

In an embodiment, as described above with reference to FIGS. 8 and 9, the second external electronic device 230 may update the firmware installed in the second external electronic device 230 on the basis of the updating files 810 and 910 received from the first electronic device 211 and/or the second electronic device 213. For example, the second external electronic device 230 may update the firmware installed in the second external electronic device 230 on the basis of an address of an area of the memory 615 (e.g., a first area and a second area), which stores the updating file, in case that the first updating file (e.g., even-numbered data) received from the first electronic device 211 is stored in the first area (e.g., even-numbered address numbers among the address numbers in the memory 615) of the memory (e.g., the memory 615 in FIG. 6), and the second updating file (e.g., the second updating file (e.g., odd-numbered data)) received from the second electronic device 213 is stored in the second area (e.g., odd-numbered address numbers among the address numbers in the memory 615) of the memory 615.

In various embodiments, although not illustrated, the second external electronic device 230 may transmit, to the electronic device 501, state information, which is related to the updating of the firmware, such as information on a state before the updating of the firmware is started, information on a failure of the updating while the firmware is updated, and/or information on the completion of the updating of the firmware.

In various embodiments, although not illustrated, the second external electronic device 230 may include an indicator (e.g., one or more LED devices capable of producing outputs) that indicates an operating state of the second external electronic device 230. The indicator may output firmware updating progress situations (e.g., preparation of firmware updating, performing of firmware updating, completion of firmware updating, and/or failure of firmware updating).

The present disclosure is not limited thereto. The electronic device 501 may output the received firmware updating progress situation through an output device such as the speaker (e.g., the speaker 520 in FIG. 5).

As another example, the electronic device 501 may transmit the firmware updating progress situation, which is received from the second external electronic device 230, to the first external electronic device 220 in case that the second external electronic device 230 is updated (e.g., the second external electronic device 230 is updated in the state in which the electronic device 501 is seated in the second external electronic device 230 and the cover of the second external electronic device 230 is in the open state) in the state in which the electronic device 501, the first external electronic device 220, and the second external electronic device 230 are in communication connection. The first external electronic device 220 may output the updating progress situation, which is related to the firmware installed in the second external electronic device 230, on the display (e.g., the display module 160 in FIG. 1).

In various embodiments, the user may intuitively identify the firmware updating progress situation as the updating progress situation related to the firmware installed in the second external electronic device 230 is output by the indicator of the second external electronic device 230, the speaker 520 of the electronic device 501, and/or the display 160 of the first external electronic device 220.

In various embodiments, in case that the designated condition for updating the second external electronic device 230 is satisfied, the second external electronic device 230 is updated by using the updating file (e.g., the updating files 810 and 910 in FIGS. 8 and 9) received from at least one electronic device (e.g., the first electronic device 211 and/or the second electronic device 213), which may improve the stability of the updating of the second external electronic device 230.

Figure 11:
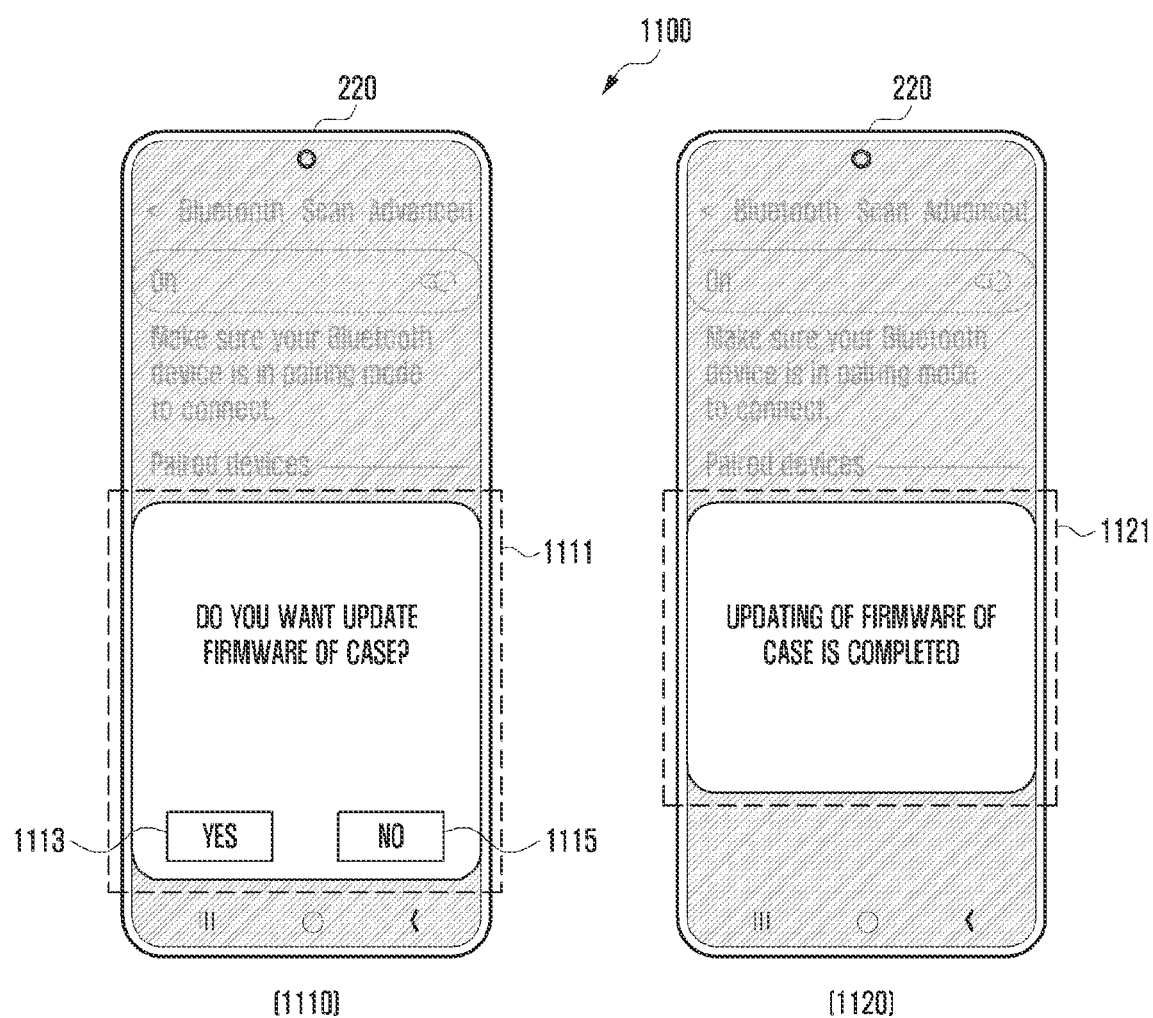
FIG. 11 is a diagram illustrating an example user interface related to the update of the second external electronic device according to various embodiments.

FIG. 11 is a diagram 1100 illustrating an example user interface related to the updating of the second external electronic device 230 according to various embodiments.

With reference to FIG. 11, the first external electronic device 220 may receive information related to the updating of the firmware installed in the second external electronic device 230 from the electronic device (e.g., the electronic device 501 in FIG. 5) (e.g., the first electronic device 211 and/or the second electronic device 213 in FIG. 2). For example, the information related to the updating of the firmware may include information on the start of the updating of the firmware, information on a failure of the updating during the updating of the firmware, and/or information on the completion of the updating of the firmware. In an embodiment, the first external electronic device 220 may output the information, which is related to the updating of the firmware installed in the second external electronic device 230, on the display (e.g., the display module 160 in FIG. 1).

For example, as illustrated in reference numeral <1110>, in case that the updating file for updating the firmware of the second external electronic device 230 exists, the first external electronic device 220 may display, on the display 160, a pop-up window 1111 including a notification message (e.g., "Do you want to update firmware of case?") related to the updating of the firmware of the second external electronic device 230. The first external electronic device 220 may further display an item 1113 (e.g., YES) for updating the firmware of the second external electronic device 230, and an item 1115 (e.g., NO) for not updating the firmware of the second external electronic device 230.

As another example, as illustrated in reference numeral <1120>, in case that the updating of the firmware of the second external electronic device 230 is completed, the first external electronic device 220 may display, on the display 160, a pop-up window 1121 including a notification message (e.g., "Updating of firmware of case is completed") related to the completion of the updating of the firmware.

Figure 12A:
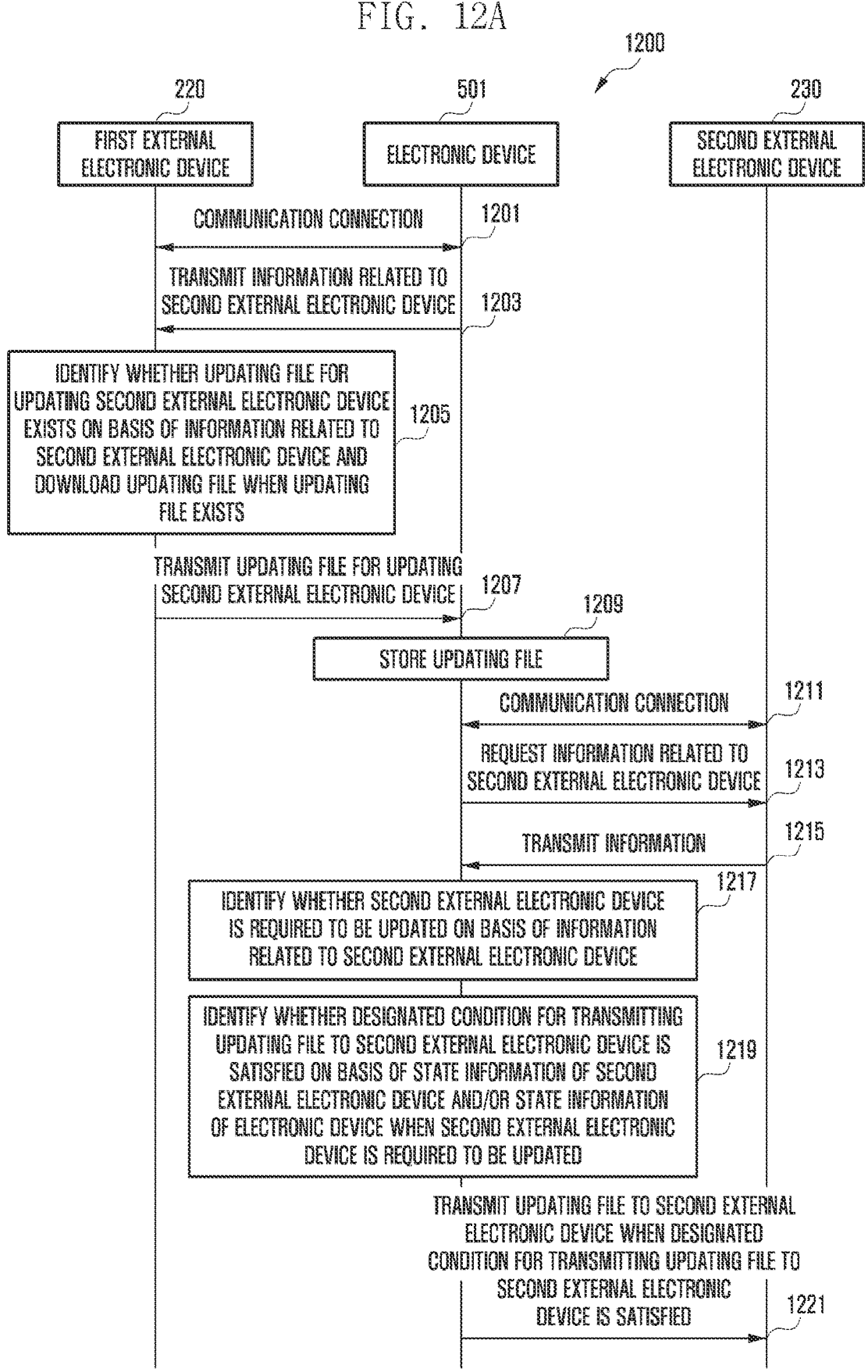
FIGS. 12A and 12B are signal flow diagrams illustrating example operations between the electronic device, the first external electronic device, and the second external electronic device according to various embodiments.
Figure 12B:
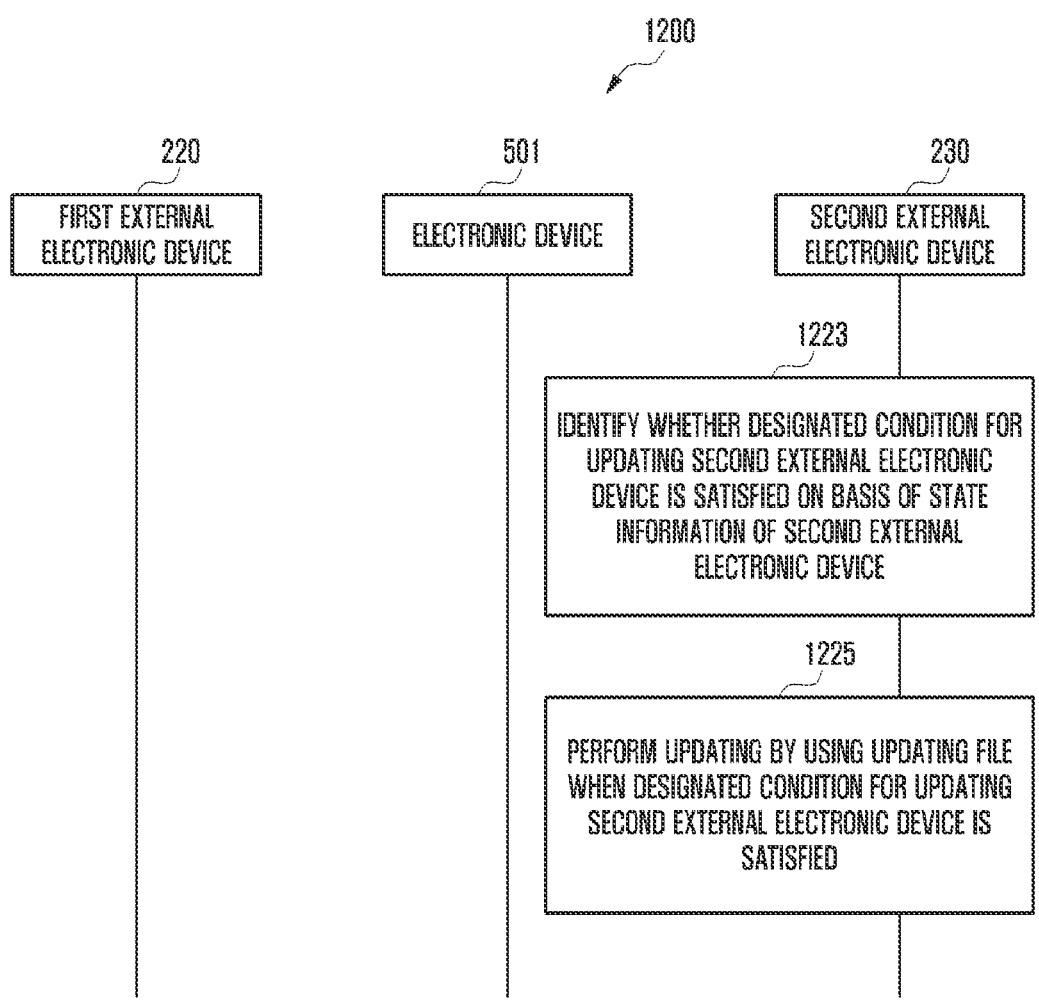

FIGS. 12A and 12B are signal flow diagrams 1200 illustrating example operations between the electronic device 501, the first external electronic device 220, and the second external electronic device 230 according to various embodiments.

Because the operation of the electronic device 501 according to various embodiments is identical or similar to the operation of the electronic device 501 illustrated in FIG. 7, a detailed description thereof may be replaced with the description described with reference to FIG. 7. Because the operation of the second external electronic device 230 according to various embodiments is identical or similar to the operation of the second external electronic device 230 illustrated in FIG. 10, a detailed description thereof may be replaced with the description described with reference to FIG. 10.

With reference to FIGS. 12A and 12B, at operation 1201, the electronic device 501 and the first external electronic device 220 may establish a communication connection and be in communication.

In various embodiments, the electronic device 501 may include at least one of the first electronic device (e.g., the first electronic device 211 in FIG. 2) and the second electronic device (e.g., the second electronic device 213 in FIG. 2).

In an embodiment, as described above with reference to FIG. 3, the electronic devices 501 (e.g., the first electronic device 211 and the second electronic device 213) may be in communication connection with the first external electronic device 220 through the short-range wireless communication by the relay method, the sniffing method, or the TWS+ method.

In an embodiment, at operation 1203, the electronic device 501 may transmit the information related to the second external electronic device 230 to the first external electronic device 220. The information related to the second external electronic device 230 may include identification information of the second external electronic device 230, state information, and/or information related to the firmware. For example, the identification information of the second external electronic device 230 may include a mac address, a device type, a model name, a model number, a serial number, and/or a manufacturer name. The state information of the second external electronic device 230 may include battery state information (e.g., battery residual amount information) of the second external electronic device 230, temperature state information, a current process state, and/or charge state information. The information related to the firmware may include a firmware binary name, a firmware binary, and/or firmware version information.

In an embodiment, at operation 1205, the first external electronic device 220 may identify whether the updating file for updating the second external electronic device 230 exists on the basis of the information related to the second external electronic device 230, and the first external electronic device 220 may download the updating file in case that updating file exists. For example, the first external electronic device 220 may identify whether the updating file for updating the firmware installed in the second external electronic device 230 exists on the basis of the information related to the second external electronic device 230 received from the electronic device 501 by accessing the server related to the firmware updating or using the application (e.g., manager application) related to the firmware updating. For example, the first external electronic device 220 may download the updating file from the server in case that an updating file, which is a higher level version than the version information of the firmware corresponding to the second external electronic device 230, exists in the server.

In an embodiment, at operation 1207, the first external electronic device 220 may transmit the updating file for updating the second external electronic device 230 to the electronic device 501. At operation 1209, the electronic device 501 may store the updating file in the memory (e.g., the memory 515 in FIG. 5).

For example, the first external electronic device 220 may transmit the updating file to the electronic device 501 to transmit the updating file to the second external electronic device 230 through the electronic device 501 and allow the second external electronic device 230 to update the firmware. In various embodiments, the first external electronic device 220 may transmit the updating file for updating the second external electronic device 230 to the electronic device 501 at a designated time point or when a designated event is detected. For example, the designated event may include a user input for downloading the updating file. The designated time point may include a time point of the communication connection with the electronic device 501.

The configuration has been described in which whether the updating file for updating the second external electronic device 230 exists is identified on the basis that the first external electronic device 220 receives the information related to the second external electronic device 230 from the electronic device 501 at operation 1205 in FIG. 12A according to various embodiments. However, the present disclosure is not limited thereto.

For example, the first external electronic device 220 may receive the information related to the second external electronic device 230 and store the information in the memory (e.g., the memory 130 in FIG. 1) on the basis of the previous communication connection with the electronic device 501. The first external electronic device 220 may periodically perform the operation of identifying whether the updating file for updating the second external electronic device 230 exists in the server on the basis of the information related to the second external electronic device 230 stored in advance in the memory 130 regardless of whether the first external electronic device 220 is in communication connection with the electronic device 501. In this case, the first external electronic device 220 may transmit the updating file for updating the second external electronic device 230 to the electronic device 501 at a time point (e.g., operation 1201) at which the first external electronic device 220 is in communication connection with the electronic device 501. In an embodiment, the first external electronic device 220 may transmit the updating file to the electronic device 501, e.g., the first electronic device 211 and the second electronic device 213. In this case, the first electronic device 211 and the second electronic device 213 may receive the same updating file (e.g., the updating file 810 in FIG. 8) from the first external electronic device 220 and store the updating file in the memory (e.g., the memory 515 in FIG. 5).

The present disclosure is not limited thereto. In an embodiment, the first external electronic device 220 may transmit the updating file to one electronic device (e.g., the first electronic device 211 or the second electronic device 213) of the first electronic device 211 and the second electronic device 213. In this case, one electronic device (e.g., the first electronic device 211 or the second electronic device 213) may store the received updating file in the memory (e.g., the memory 515 in FIG. 5).

In an embodiment, one electronic device (e.g., the first electronic device 211 or the second electronic device 213) may divide the updating files 810 and 910, which are received from the first external electronic device 220, into the first updating file (e.g., the first updating file including even-numbered data) and the second updating file (e.g., the second updating file including odd-numbered data). One electronic device (e.g., the first electronic device 211 or the second electronic device 213) may store the first updating file in the memory 515. One electronic device (e.g., the first electronic device 211 or the second electronic device 213) may transmit the second updating file to the other electronic device (e.g., the second electronic device 213 or the first electronic device 211). The other electronic device (e.g., the second electronic device 213 or the first electronic device 211) may store the second updating file in the memory 515.

In an embodiment, the first external electronic device 220 may transmit the first updating file (e.g., the first updating file 910a in FIG. 9) of the updating files (e.g., the updating file 910 in FIG. 9) to the first electronic device 211 and transmit the second updating file (e.g., the second updating file 910b in FIG. 9) of the updating file 910 to the second electronic device 213. In this case, the first electronic device 211 may store the first updating file 910a in the memory 515. The second electronic device 213 may store the second updating file 910b in the memory 515.

In an embodiment, at operation 1211, the electronic device 501 may establish a communication connection and be in communication connection with the second external electronic device 230. For example, the electronic device 501 may perform the PLC communication with the second external electronic device 230 on the basis that the electronic device 501 is seated in the second external electronic device 230. For example, in case that the cover of the second external electronic device 230 is in the closed state or the open state in a state in which the terminals (e.g., the terminals 470 in FIG. 4) of the electronic device 501 are physically in contact with the terminals (e.g., the terminals 460 in FIG. 4) of the second external electronic device 230 or a state in which the terminals 470 of the electronic device 501 are physically in contact with the terminals 460 of the second external electronic device 230, the electronic device 501 may identify that the electronic device 501 is seated in the second external electronic device 230, and the electronic device 501 may perform the PLC communication with the second external electronic device 230.

In an embodiment, at operation 1213, the electronic device 501 may request the information related to the second external electronic device 230. At operation 1215, the second external electronic device 230 may transmit the information related to the second external electronic device 230 to the electronic device 501. For example, the information related to the second external electronic device 230 may include identification information (e.g., a device type, a model name, and/or a manufacturer name) of the second external electronic device 230, state information (e.g., battery residual amount information, temperature state information, current process state, charge state information, and/or sensor information), and/or information related to the firmware (e.g., a firmware binary name, a firmware binary, and/or firmware version information).

In various embodiments, the electronic device 501 may be mounted in a plurality of second external electronic devices 230. Therefore, the identification information of the second external electronic device 230 seated before the communication connection with the first external electronic device 220 (e.g., before operation 1201) may be different from the identification information of the second external electronic device 230 being in communication connection at operation 1211. Operation 1213 described above may be an operation of identifying whether the updating file (e.g., operation 1207) received from the first external electronic device 220 is matched with the updating file for updating the firmware corresponding to the identification information of the second external electronic device 230 being in communication connection at operation 1211.

In an embodiment, at operation 1217, the electronic device 501 may identify whether the second external electronic device 230 is required to be updated on the basis of the information related to the second external electronic device 230.

For example, in case that the updating file (e.g., operation 1207) received from the first external electronic device 220 is matched with the updating file for updating the firmware corresponding to the identification information of the second external electronic device 230 being in communication connection at operation 1211, the electronic device 501 may identify whether the second external electronic device 230 is required to be updated on the basis of the information related to the second external electronic device 230. For example, when the electronic device 501 identifies that the version information of the updating file for updating the second external electronic device 230 received from the first external electronic device 220 is a higher level version than the version information of the firmware installed in the second external electronic device 230, the electronic device 501 may identify that the second external electronic device 230 is required to be updated.

In an embodiment, at operation 1219, when it is identified that the second external electronic device 230 is required to be updated, the electronic device 501 may identify whether a designated condition for transmitting the updating file to the second external electronic device 230 is satisfied on the basis of the state information of the second external electronic device 230 and/or the state information of the electronic device 501. For example, the electronic device 501 may identify that the designated condition for transmitting the updating file to the second external electronic device 230 is satisfied in a case in which the cover (e.g., the second housing structure 420 in FIG. 4) is a closed or open state, a case in which the battery residual amounts of the electronic device 501 and the second external electronic device 230 exceed a designated value, a case in which a temperature of the second external electronic device 230 is included in a designated range, a case in which the second external electronic device 230 is stably in a state of being charged, and/or a case in which sensor information of the electronic device 501 is in a stable state for a predetermined time or more in a state in which the electronic device 501 is seated, the terminals 470 of the electronic device 501 (e.g., the electronic device 501 (e.g., the first electronic device 211 and/or the second electronic device 213) are physically in contact with the terminals 460 of the second external electronic device 230, and the terminals 470 of the electronic device 501 (e.g., the first electronic device 211 and/or the second electronic device 213) are physically in contact with the terminals 460 of the second external electronic device 230.

In an embodiment, at operation 1221, the electronic device 501 may transmit the updating file to the second external electronic device 230 in case that the designated condition for transmitting the updating file to the second external electronic device is satisfied.

In an embodiment, the updating file for updating the second external electronic device 230 may be stored in the first electronic device 211 and/or the second electronic device 213. In case that the updating file is stored in one of the first electronic device 211 and the second electronic device 213, one electronic device, which stores the updating file, may transmit the updating file to the second external electronic device 230 through the PLC communication on the basis that the designated condition for transmitting the updating file to the second external electronic device 230 is satisfied.

In an embodiment, in case that the updating file (e.g., the updating file 810 in FIG. 8) is stored in the first electronic device 211 and the second electronic device 213, the first electronic device 211 and the second electronic device 213 may transmit the updating file 810 to the second external electronic device 230 through the PLC communication. For example, the first electronic device 211 may transmit at least some of the updating files 810 (e.g., even-numbered data of the updating file 810) to the second external electronic device 230. The second electronic device 213 may transmit at least some of the updating files 810 (e.g., odd-numbered data of the updating file 810) to the second external electronic device 230.

In an embodiment, the first electronic device 211 may transmit the first updating file 910a to the second external electronic device 230 through the PLC communication (e.g., the first PLC communication) in case that the first updating file 910a of the updating files is stored in the first electronic device 211 and the second updating file 910b is stored in the second electronic device 213. The second electronic device 213 may transmit the second updating file 910b to the second external electronic device 230 through the PLC communication (e.g., the second PLC communication).

In an embodiment, at operation 1223 (see FIG. 12B), the second external electronic device 230 may identify whether the designated condition for updating the second external electronic device 230 is satisfied on the basis of the state information of the second external electronic device 230. At operation 1225, the second external electronic device 230 may perform the updating using the updating file in case that the designated condition for updating the second external electronic device 230 is satisfied.

For example, the second external electronic device 230 may identify (or determine) that the designated condition for updating the second external electronic device 230 is satisfied in a case in which the second external electronic device 230 is in the SA mode, a case in which the battery residual amount of the second external electronic device 230 exceeds a designated value, a case in which a temperature of the second external electronic device 230 is included in a designated range, a case in which the second external electronic device 230 is stably in a state of being charged, and/or a case in which a user input for updating the firmware installed in the second external electronic device 230 is detected. Further, the updating may be performed using the updating files 810 and 910 received from the first electronic device 211 and/or the second electronic device 213.

FIGS. 13A and 13B are signal flow diagrams 1300 illustrating example operations between the electronic device 501, the first external electronic device 220, and the second external electronic device 230 according to various embodiments.

FIGS. 13A and 13B according to various embodiments illustrate an example method of updating the second external electronic device 230 in case that the electronic device 501 and the first external electronic device 220 according to various embodiments receive the user input for updating the second external electronic device 230 from the first external electronic device 220 through the electronic device 501 in the state in which the electronic device 501 and the first external electronic device 220 are in communication connection.

Because operations 1301 to 1317 in FIG. 13A according to various embodiments are identical or similar to operations 1201 to 1217 in FIG. 12A described above, a detailed description thereof may be replaced with the description described with reference to FIG. 12A.

With reference to FIGS. 13A and 13B, at operation 1301, the electronic device 501 may establish a communication connection and be in communication with the first external electronic device 220. In various embodiments, the electronic device 501 may include at least one of the first electronic device (e.g., the first electronic device 211 in FIG. 2) and the second electronic device (e.g., the second electronic device 213 in FIG. 2). At operation 1303, the electronic device 501 may transmit information related to the second external electronic device 230 (e.g., identification information, state information, and/or information related to the firmware) to the first external electronic device 220 on the basis that the electronic device 501 is in communication connection with the first external electronic device 220.

In an embodiment, at operation 1305, the first external electronic device 220 may identify whether the updating file for updating the second external electronic device 230 exists on the basis of the information related to the second external electronic device 230, and the first external electronic device 220 may download the updating file in case that updating file exists. At operation 1307, the first external electronic device 220 may transmit the downloaded updating file for updating the second external electronic device 230 to the electronic device 501.

In an embodiment, at operation 1309, the electronic device 501 may store the updating file in the memory (e.g., the memory 515 in FIG. 5). At operation 1311, the electronic device 501 may establish a communication connection with the second external electronic device 230. For example, as the electronic device 501 is seated in the second external electronic device 230, electrical connection may occur between the terminals (e.g., the terminals 460 in FIG. 4) of the second external electronic device 230 and the terminals (e.g., the terminals 470) of the first electronic device 211 or between the terminals (e.g., the terminals 460 in FIG. 4) of the second external electronic device 230 and the terminals of the second electronic device 213. The electronic device 501 may perform the PLC communication with the second external electronic device 230 on the basis of the occurrence of the electrical connection. For example, in case that the cover of the second external electronic device 230 is in the closed state or the open state in a state in which the terminals 470 of the electronic device 501 are physically in contact with the terminals 460 of the second external electronic device 230 or a state in which the terminals 470 of the electronic device 501 are physically in contact with the terminals 460 of the second external electronic device 230, the electronic device 501 may identify that the electronic device 501 is seated in the second external electronic device 230, and the electronic device 501 may perform the PLC communication with the second external electronic device 230.

In an embodiment, at operation 1313, the electronic device 501 may request the information related to the second external electronic device 230. At operation 1315, the second external electronic device 230 may transmit the information to the electronic device 501. At operation 1317, the electronic device 501 may identify whether the second external electronic device 230 is required to be updated on the basis of the information related to the second external electronic device 230.

In an embodiment, at operation 1319, the electronic device 501 may transmit a signal related to the necessity of the updating of the second external electronic device 230 to the first external electronic device 220 in case that the second external electronic device 230 is required to be updated. For example, when the electronic device 501 identifies that the version information of the updating file for updating the second external electronic device 230 received from the first external electronic device 220 is a higher level version than the version information of the firmware installed in the second external electronic device 230, the electronic device 501 may identify that the second external electronic device 230 is required to be updated, and the electronic device 501 may transmit the signal related thereto to the first external electronic device 220.

In an embodiment, at operation 1321, the first external electronic device 220 may transmit a signal for requesting the preparation of the updating of the second external electronic device 230 to the electronic device 501 on the basis of the detection of an input for requesting the updating of the second external electronic device 230.

In an embodiment, at operation 1323, the electronic device 501 may transmit the signal for requesting the preparation of the updating to the second external electronic device 230. At operation 1325, the second external electronic device 230 may identify whether the designated condition for the updating is satisfied on the basis of the state information and the reception of the signal for requesting the preparation of the updating from the electronic device 501. For example, the second external electronic device 230 may identify that the designated condition for updating the second external electronic device 230 is satisfied in a case in which the second external electronic device 230 is in the SA mode, a case in which the battery residual amount of the second external electronic device 230 exceeds a designated value, a case in which a temperature of the second external electronic device 230 is included in a designated range, a case in which the second external electronic device 230 is stably in a state of being charged, and/or a case in which a user input for updating the firmware installed in the second external electronic device 230 is detected.

In an embodiment, at operation 1327, the second external electronic device 230 may transmit a signal, which is related to the completion of the preparation of the updating, to the electronic device 501 in case that the designated condition for the updating is satisfied. At operation 1329, the electronic device 501 may transmit the signal, which is related to the completion of the preparation of the updating of the second external electronic device 230, to the first external electronic device 220 on the basis that the signal related to the completion of the preparation of the updating is received from the second external electronic device 230. At operation 1331, the first external electronic device 220 may transmit a signal for requesting the start of the updating of the second external electronic device 230 to the electronic device 501.

For example, the first external electronic device 220 may output a user interface (e.g., reference numeral <1110> in FIG. 11), which is related to the updating of the second external electronic device 230 on the display (e.g., the display module 160 in FIG. 1) on the basis of the completion of the preparation of the updating of the second external electronic device 230. When the user input for requesting the start of the updating of the second external electronic device 230 (e.g., a user input for selecting the item 1113 (e.g., YES) for updating the firmware of the second external electronic device 230 included in the user interface in reference numeral <1110> in FIG. 11) is detected by the user interface, the first external electronic device 220 may transmit the signal for requesting the start of the updating of the second external electronic device 230 to the electronic device 501.

In an embodiment, at operation 1333, the electronic device 501 may transmit the signal for requesting the start of the updating to the second external electronic device 230. At operation 1335, the second external electronic device 230 may request the updating file from the electronic device 501. At operation 1337, the electronic device 501 may transmit the updating file to the second external electronic device 230, as a response to the reception of the request for the updating file from the second external electronic device 230.

In an embodiment, the updating file for updating the second external electronic device 230 may be stored in the first electronic device 211 and/or the second electronic device 213. For example, in case that the updating file is stored in one of the first electronic device 211 and the second electronic device 213, one electronic device, which stores the updating file, may transmit the updating file to the second external electronic device 230 through the PLC communication. As another example, in case that the updating file is stored in the first electronic device 211 and the second electronic device 213, the first electronic device 211 may transmit at least some of the updating files (e.g., even-numbered data of the updating file) to the second external electronic device 230. The second electronic device 213 may transmit at least some of the updating files (e.g., odd-numbered data of the updating file) to the second external electronic device 230. As still another example, the first electronic device 211 may transmit the first updating file to the second external electronic device 230 through the PLC communication in case that the first updating file (e.g., even-numbered data including the updating file) of the updating files is stored in the first electronic device 211 and the second updating file (e.g., odd-numbered data including the updating file) is stored in the second electronic device 213. The second electronic device 213 may transmit the second updating file to the second external electronic device 230 through the PLC communication.

In an embodiment, at operation 1339, the second external electronic device 230 may perform the updating using the updating file. At operation 1341, when the updating is completed, the second external electronic device 230 may transmit a single related to the completion of the updating to the electronic device 501. At operation 1343, the electronic device 501 may store information on the completion of the updating of the second external electronic device 230 and update the version information of the second external electronic device 230 stored in the memory (e.g., the memory 515 in FIG. 5). At operation 1345, the electronic device 501 may transmit the information on the completion of the updating of the second external electronic device 230 and the version information of the second external electronic device 230 to the first external electronic device 220. The first external electronic device 220 may update the information of the second external electronic device 230 stored in the memory (e.g., the memory 130 in FIG. 1) on the basis of the information on the completion of the updating of the second external electronic device 230 and the version information of the second external electronic device 230 received from the electronic device 501.

In an embodiment, the first external electronic device 220 may output a user interface (e.g., reference numeral <1120> in FIG. 11) related to the completion of the updates on the display 160 on the basis of the information on the completion of the updating of the second external electronic device 230 from the electronic device 501.

Figure 14A:
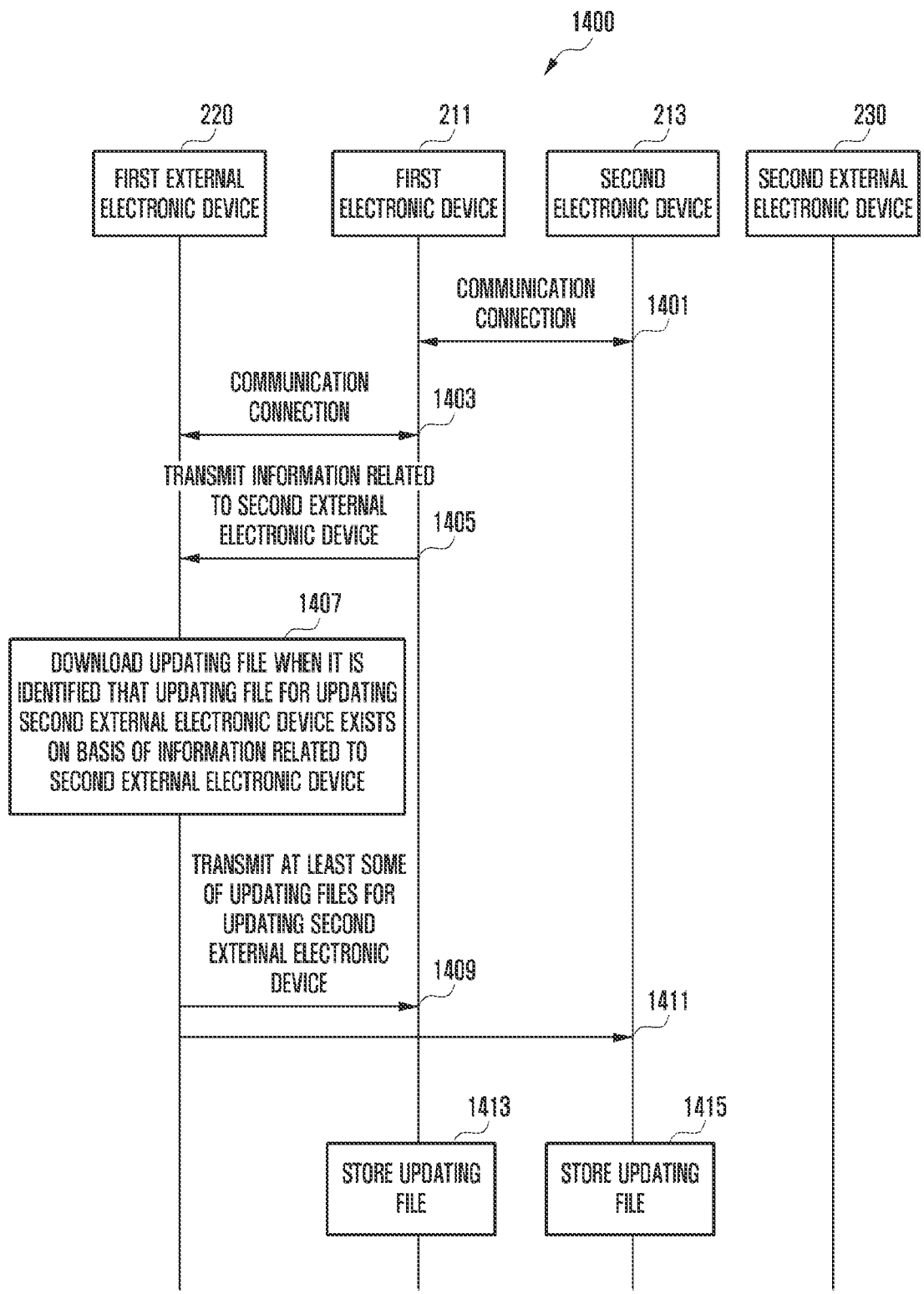
FIGS. 14A and 14B are signal flow diagrams illustrating example operations between the first electronic device, the second electronic device, the first external electronic device, and the second external electronic device according to various embodiments.
Figure 14B:
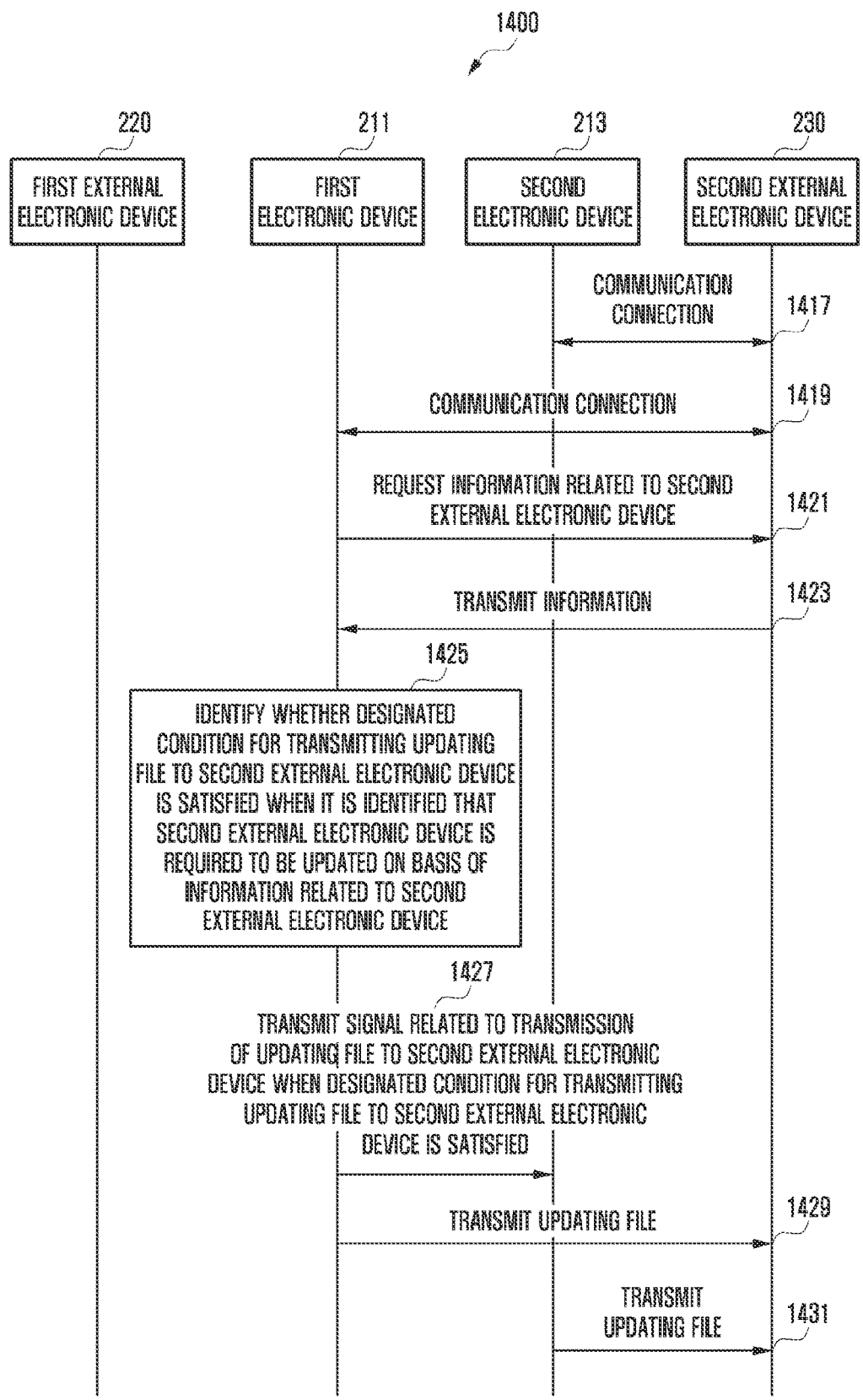

FIGS. 14A and 14B are signal flow diagrams 1400 illustrating example operations between the first electronic device 211, the second electronic device 213, the first external electronic device 220, and the second external electronic device 230 according to various embodiments.

FIGS. 14A and 14B according to various embodiments are views illustrating example operation of the electronic device 501 (e.g., the first electronic device 211 and the second electronic device 213) that receives at least some of the updating files for the second external electronic device 230 from the first external electronic device 220 and transmits at least some of the updating files to the second external electronic device 230.

Because operations 1403 to 1409 in FIG. 14A and operations 1417 to 1425 in FIG. 14B according to various embodiments are identical or similar to operations 1201 to 1207 and operations 1211 to 1219 in FIG. 12A described above, a detailed description thereof may be replaced with the description described with reference to FIG. 12A.

In FIGS. 14A and 14B according to various embodiments, the description will be made on the assumption that the first electronic device 211 of the first and second electronic devices 211 and 213 is representatively in communication connection with the first external electronic device 220.

With reference to FIGS. 14A and 14B, at operation 1401, the first electronic device 211 may establish a communication connection and be in communication with the second electronic device 213. At operation 1403, the first electronic device 211 may establish a communication connection and be in communication with the first external electronic device 220. As described above with reference to FIG. 3 according to various embodiments, the first electronic device 211 and/or the second electronic device 213 may be in communication connection with the first external electronic device 220 through the short-range wireless communication by the relay method, the sniffing method, or the TWS+ method.

In an embodiment, at operation 1405, the first electronic device 211 may transmit information related to the second external electronic device 230 (e.g., identification information, state information, and/or information related to the firmware) to the first external electronic device 220 on the basis that the electronic device 501 is in communication connection with the first external electronic device 220.

In an embodiment, at operation 1407, the first external electronic device 220 may download the updating file from the server when it is identified that the updating file for updating the second external electronic device 230 exists in the server on the basis of the information related to the second external electronic device 230 received from the first electronic device 211.

In an embodiment, at operation 1409, the first external electronic device 220 may transmit at least some of the updating files for updating the second external electronic device 230 to the first electronic device 211. At operation 1411, the first external electronic device 220 may transmit at least some of the updating files for updating of the second external electronic device 230 to the second electronic device 213. For example, as described above with reference to FIG. 8, the first external electronic device 220 may transmit all the updating files 810 (e.g., 0th data to 15th data) for updating the second external electronic device 230 to the first electronic device 211 and the second electronic device 213. As another example, as described above with reference to FIG. 9, the first external electronic device 220 may transmit at least some 910a (e.g., even-numbered data) of the updating files 910 for updating the second external electronic device 230 to the first electronic device 211 and transmit at least some 910b (e.g., odd-numbered data) of the updating files 910 to the second electronic device 213.

In various embodiments, the configuration has been described in which the first external electronic device 220 transmits the updating file for updating the second external electronic device 230 to the first electronic device 211 (e.g., operation 1409) and then transmits the updating file to the second electronic device 213 (e.g., operation 1411). However, the present disclosure is not limited thereto. For example, operations 1409 and 1411 may be simultaneously performed.

In an embodiment, at operation 1413, the first electronic device 211 may store the updating files (e.g., all the updating files or at least some of the updating files), which are received from the first external electronic device 220, in the memory 515 of the first electronic device 211. At operation 1415, the second electronic device 213 may store the updating files (e.g., all the updating files or at least some of the updating files), which are received from the first external electronic device 220, in the memory 515 of the second electronic device 213.

In an embodiment, at operations 1417 and 1419, the first electronic device 211 and the second electronic device 213 may establish and be in communication connection with the second external electronic device 230. For example, the first electronic device 211 and the second electronic device 213 may perform the PLC communication with the second external electronic device 230 on the basis that the first electronic device 211 and the second electronic device 213 are seated in the second external electronic device 230.

In an embodiment, at operation 1421, the first electronic device 211 may request the information related to the second external electronic device 230. At operation 1423, the second external electronic device 230 may transmit the information related to the second external electronic device 230 (e.g., identification information, state information, and/or information related to the firmware) to the first electronic device 211.

In an embodiment, at operation 1425, the first electronic device 211 may identify whether the designated condition for transmitting the updating file to the second external electronic device 230 is satisfied when it is identified that the second external electronic device 230 is required to be updated on the basis of the information related to the second external electronic device 230. For example, the designated condition may include a case in which the electronic device 501 is seated in the second external electronic device 230, a case in which the battery residual amount of the electronic device 501 exceeds a designated value, a case in which the battery residual amount of the second external electronic device 230 exceeds a designated value, and/or a case in which sensor information of the electronic device 501 is in a stable state for a designated time (e.g., a state in which a sensor signal related to a motion is not detected after the electronic device 501 is seated in the second external electronic device 230). The present disclosure is not limited thereto. The designated condition may include a case in which the electronic device 501 and the first external electronic device 220 receive the user input for requesting the updating file for the second external electronic device 230 from the first external electronic device 220 through the electronic device 501 in the state in which the electronic device 501 and the first external electronic device 220 are in communication connection.

In an embodiment, in case that the designated condition for transmitting the updating file to the second external electronic device 230 is satisfied, the first electronic device 211, at operation 1427, may transmit the signal related to the transmission of the updating file for the second external electronic device 230 (e.g., a signal for requesting the transmission of at least some of the updating files stored in the second electronic device 213 to the second external electronic device 230) to the second electronic device 213.

In an embodiment, at operation 1429, the first electronic device 211 may transmit the updating file stored in the memory to the second external electronic device 230. At operation 1431, the second electronic device 213 may transmit the updating file stored in the memory to the second external electronic device 230 in response to the reception of the signal related to the transmission of the updating file received from the first electronic device 211.

In various embodiments, the configuration has been described in which the first electronic device 211 transmits the updating file to the second external electronic device 230 (e.g., operation 1429), and then the second electronic device 213 transmits the updating file to the second external electronic device 230 (e.g., operation 1431). However, the present disclosure is not limited thereto. For example, operations 1429 and 1431 may be simultaneously performed.

In FIGS. 14A and 14B according to various embodiments, the description has been made on the assumption that the first electronic device 211 of the first and second electronic devices 211 and 213 is representatively in communication connection with the first external electronic device 220. However, the present disclosure is not limited thereto. In an embodiment, the second electronic device 213 of the first and second electronic devices 211 and 213 is representatively in communication connection with the first external electronic device 220. In this case, the operation of the first electronic device 211 may be performed by the second electronic device 213, and the operation of the second electronic device 213 may be performed by the first electronic device 211.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), the element may be coupled with the other element directly (e.g., through wires), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a communication circuit;
at least one processor operatively connected to the communication circuit; and
memory storing instructions which, when executed by the at least one processor, cause the at least one processor to control the electronic device to:
receive, from a first external electronic device, an update file for updating a second external electronic device, based on establishing a communication connection with the first external electronic device through the communication circuit, the second external electronic device comprising a case for seating the electronic device,
identify whether the second external electronic device is required to be updated based on the electronic device being electrically connected to the second external electronic device by being seated in the second external electronic device,
identify, based on identifying that the second external electronic device is required to be updated, whether a condition for transmitting the update file to the second external electronic device is satisfied based on state information of the second external electronic device and state information of the electronic device, and
transmit the update file, received from the first external electronic device, to the second external electronic device based on identifying that the condition for transmitting the update file to the second external electronic device is satisfied,
wherein the condition comprises at least one of:
a condition in which a battery residual amount of the electronic device exceeds a designated value and a battery residual amount of the second external electronic device exceeds the designated value, or
a condition in which a value of a sensor signal of the electronic device does not exceed a specified value maintained for a designated time.

2. The electronic device of claim 1, wherein memory stores instructions which, when executed by the at least one processor, cause the at least one processor to control the electronic device to:
transmit, to the first external electronic device, information related to the second external electronic device based on the communication connection with the first external electronic device,
wherein the information related to the second external electronic device includes at least one of identification information of the second external electronic device, state information, or information related to firmware installed in the second external electronic device.

3. The electronic device of claim 1, wherein memory stores instructions which, when executed by the at least one processor, cause the at least one processor to control the electronic device to:
store at least a first portion of the received update file in the memory, and
transmit at least a second portion of the remaining received update file to a third external electronic device.

4. The electronic device of claim 3, wherein memory stores instructions which, when executed by the at least one processor, cause the at least one processor to control the electronic device to:
transmit, using the communication circuit, to the third external electronic device, a signal for requesting transmission of at least some of the second portion of the remaining update file to the second external electronic device based on the condition for transmitting the update file to the second external electronic device being satisfied.

5. The electronic device of claim 1, wherein memory stores instructions which, when executed by the at least one processor, cause the at least one processor to control the electronic device to:
identify that the electronic device is seated in the second external electronic device based on a terminal of the electronic device being physically in contact with a terminal of the second external electronic device as the electronic device is accommodated in a groove formed in a housing of the second external electronic device, based on a cover of the second external electronic device being detected as being in a closed state in a state in which the terminal of the electronic device is physically in contact with the terminal of the second external electronic device, based on a designated time elapsing after the cover is detected as being in the closed state in the state in which the terminal of the electronic device is physically in contact with the terminal of the second external electronic device, or based on the cover being detected as being in an open state from the closed state in the state in which the terminal of the electronic device is physically in contact with the terminal of the second external electronic device.

6. The electronic device of claim 5, wherein memory stores instructions which, when executed by the at least one processor, cause the at least one processor to control the electronic device to:
perform power line communication (PLC) with the second external electronic device based on the electronic device being seated in the second external electronic device.

7. The electronic device of claim 6, wherein memory stores instructions which, when executed by the at least one processor, cause the at least one processor to control the electronic device to:
request information related to the second external electronic device from the second external electronic device through the power line communication; and
receive the information related to the second external electronic device from the second external electronic device, in response to the request.

8. The electronic device of claim 7, wherein memory stores instructions which, when executed by the at least one processor, cause the at least one processor to control the electronic device to:
identify that the second external electronic device is required to be updated based on version information of the update file received from the first external electronic device being a higher level version than version information of firmware among pieces of information related to the second external electronic device received from the second external electronic device.

9. The electronic device of claim 1, wherein the state information of the electronic device includes at least one of battery information or sensor information of the electronic device, and wherein the state information of the second external electronic device includes at least one of battery state information or charge state information of the second external electronic device.

10. The electronic device of claim 9, wherein
the condition further comprises a condition in which the second external electronic device being in a state of being charged.

11. A method of updating an external electronic device using an electronic device, the method comprising:
receiving, from a first external electronic device, an update file for updating a second external electronic device, based on a communication connection with the first external electronic device, the second external electronic device comprising a case for seating the electronic device;
identifying whether the second external electronic device is required to be updated based on the electronic device being electrically connected to the second external electronic device by being seated in the second external electronic device;
identifying, based on identifying that the second external electronic device is required to be updated, whether a condition for transmitting the update file to the second external electronic device is satisfied based on state information of the second external electronic device and state information of the electronic device; and
transmitting the update file, received from the first external electronic device, to the second external electronic device based on identifying that the condition for transmitting the update file to the second external electronic device is satisfied,
wherein the condition comprises at least one of:
a condition in which a battery residual amount of the electronic device exceeds a designated value and a battery residual amount of the second external electronic device exceeds the designated value, or
a condition in which a value of a sensor signal of the electronic device does not exceed a specified value maintained for a designated time.

12. The method of claim 11, further comprising:
transmitting, to the first external electronic device, information related to the second external electronic device based on the communication connection with the first external electronic device,
wherein the information related to the second external electronic device includes at least one of identification information of the second external electronic device, state information, or information related to firmware installed in the second external electronic device.

13. The method of claim 11, wherein the identifying of whether the second external electronic device is required to be updated comprises:
identifying that the electronic device is seated in the second external electronic device based on a terminal of the electronic device being physically in contact with a terminal of the second external electronic device as the electronic device is accommodated in a groove formed in a housing of the second external electronic device, based on a cover of the second external electronic device being detected as being in a closed state in a state in which the terminal of the electronic device is physically in contact with the terminal of the second external electronic device, based on a designated time elapsing after the cover is detected as being in the closed state in the state in which the terminal of the electronic device is physically in contact with the terminal of the second external electronic device, or based on the cover being detected as being in an open state from the closed state in the state in which the terminal of the electronic device is physically in contact with the terminal of the second external electronic device.

14. The method of claim 11, wherein the identifying of whether the second external electronic device is required to be updated comprises:
performing power line communication (PLC) with the second external electronic device based on the electronic device being seated in the second external electronic device;
requesting information related to the second external electronic device from the second external electronic device through the power line communication;
receiving the information related to the second external electronic device from the second external electronic device, in response to the request; and
identifying that the second external electronic device is required to be updated based on version information of the update file received from the first external electronic device being a higher level version than version information of firmware among pieces of information related to the second external electronic device received from the second external electronic device.

15. The method of claim 11,
the condition further comprises a condition in which the second external electronic device being in a state of being charged.

* * * * *